(12) United States Patent
Hoover et al.

(10) Patent No.: US 12,457,389 B2
(45) Date of Patent: Oct. 28, 2025

(54) PLATFORM TO PROVIDE SUPPLEMENTAL MEDIA CONTENT BASED ON CONTENT OF A MEDIA STREAM AND A USER ACCESSING THE MEDIA STREAM

(71) Applicant: Capital One Services, LLC, McLean, VA (US)

(72) Inventors: Jason Hoover, McLean, VA (US); Qiaochu Tang, McLean, VA (US); Geoffrey Dagley, McLean, VA (US); Micah Price, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 155 days.

(21) Appl. No.: 18/519,562

(22) Filed: Nov. 27, 2023

(65) Prior Publication Data
US 2024/0098343 A1      Mar. 21, 2024

Related U.S. Application Data

(62) Division of application No. 17/248,123, filed on Jan. 11, 2021, now Pat. No. 11,882,343, which is a
(Continued)

(51) Int. Cl.
*H04N 21/81*       (2011.01)
*H04N 21/25*       (2011.01)
(Continued)

(52) U.S. Cl.
CPC ....... *H04N 21/8133* (2013.01); *H04N 21/251* (2013.01); *H04N 21/41422* (2013.01);
(Continued)

(58) Field of Classification Search
None
See application file for complete search history.

(56) References Cited

U.S. PATENT DOCUMENTS

| 10,127,591 B1 | 11/2018 | Wollmer et al. |
| 10,631,057 B2 | 4/2020 | Yeh et al. |
| (Continued) | | |

OTHER PUBLICATIONS

Dupre E., "BMW Test Drives New AR Experience", Feb. 3, 2017, 5 pages.
(Continued)

*Primary Examiner* — Jason K Lin
(74) *Attorney, Agent, or Firm* — Harrity & Harrity, LLP

(57) ABSTRACT

A device detects that a user device is accessing a media stream that enables the user device to display, via a user interface, media content associated with a subject. The device receives a search query associated with the user device and the media stream, and determines, based on the search query, that a user associated with the user device has a threshold level of interest in a feature of the subject. The device receives feature information associated with the feature based on determining that the user has the threshold level of interest, and receives feature content data that is associated with feature content that includes the feature information. The device causes the feature content to be embedded into the media stream to cause the user device to display the feature content in relation to the feature when the feature is displayed in the media content via the user interface.

20 Claims, 10 Drawing Sheets

Related U.S. Application Data division of application No. 16/286,233, filed on Feb. 26, 2019, now Pat. No. 10,893,339.

(51) Int. Cl.

| | | |
|---|---|---|
| *H04N 21/414* | (2011.01) | |
| *H04N 21/431* | (2011.01) | |
| *H04N 21/442* | (2011.01) | |
| *H04N 21/482* | (2011.01) | |
| *H04N 21/6334* | (2011.01) | |

(52) U.S. Cl.
CPC ..... *H04N 21/431* (2013.01); *H04N 21/44222* (2013.01); *H04N 21/4828* (2013.01); *H04N 21/6334* (2013.01)

(56) References Cited

U.S. PATENT DOCUMENTS

| | | |
|---|---|---|
| 10,893,339 B2 | 1/2021 | Hoover et al. |
| 10,979,676 B1 | 4/2021 | Kelly et al. |
| 2008/0209480 A1 | 8/2008 | Eide et al. |
| 2008/0300962 A1 | 12/2008 | Cawston et al. |
| 2009/0297118 A1 | 12/2009 | Fink et al. |
| 2010/0125875 A1* | 5/2010 | Hays .................. H04N 7/17318 |
| | | 725/61 |
| 2010/0281108 A1* | 11/2010 | Cohen .................. H04N 21/458 |
| | | 709/203 |
| 2011/0099069 A1 | 4/2011 | Hoelz et al. |
| 2013/0347018 A1 | 12/2013 | Limp et al. |
| 2014/0278308 A1 | 9/2014 | Liu et al. |
| 2015/0019640 A1 | 1/2015 | Li et al. |
| 2015/0062434 A1 | 3/2015 | Deng et al. |
| 2015/0110457 A1 | 4/2015 | Abecassis et al. |
| 2016/0019226 A1* | 1/2016 | Srikrishna ............... G06F 16/78 |
| | | 707/722 |
| 2016/0112750 A1 | 4/2016 | Hager, IV |
| 2017/0201803 A1* | 7/2017 | Wald .................... H04N 21/435 |
| 2017/0280199 A1 | 9/2017 | Davies et al. |
| 2018/0025010 A1* | 1/2018 | Ramer ................. H04N 21/251 |
| | | 707/727 |
| 2018/0220199 A1 | 8/2018 | Greenberger et al. |
| 2018/0255290 A1 | 9/2018 | Holzer et al. |
| 2019/0019335 A1 | 1/2019 | Elangovan et al. |
| 2019/0050456 A1 | 2/2019 | Gupta et al. |
| 2021/0136463 A1 | 5/2021 | Hoover et al. |

OTHER PUBLICATIONS

Dupuis M., "VIRES Virtual Test Drive®", Jul. 12, 2017, 35 pages.
Virtual Reality Test Drives, "Discover a New Reality That Will Change The Way You Shop ForCars", Feb. 9, 2017, 3 pages.

* cited by examiner

US 12,457,389 B2

PLATFORM TO PROVIDE SUPPLEMENTAL MEDIA CONTENT BASED ON CONTENT OF A MEDIA STREAM AND A USER ACCESSING THE MEDIA STREAM

RELATED APPLICATION

This application is a divisional of U.S. patent application Ser. No. 17/248,123, filed Jan. 11, 2021, which is a divisional of U.S. patent application Ser. No. 16/286,233, filed Feb. 26, 2019 (now U.S. Pat. No. 10,893,339), which are both incorporated herein by reference.

BACKGROUND

A media stream includes media content (e.g., image content, video content, audio content, and/or the like) that is sent over one or more networks (e.g., the Internet). The media content can be accessed (e.g., viewed, played, and/or the like) and/or consumed immediately by a user, rather than being saved (e.g., to a storage device) for later access or consumption. In a media stream, portions of the media content are sequentially provided in time, rather than the entire media content being provided at once or as one set of data.

SUMMARY

According to some implementations, a method may include detecting that a user device is receiving a media stream associated with a vehicle, wherein the user device is associated with a user account of a user. The method may include receiving activity data associated with the user account, wherein the activity data relates to online activity involving the vehicle, and determining a characteristic of the user based on the activity data. The method may include identifying media content of the media stream, wherein the media content includes media that is being provided, via a user interface of the user device, and that is associated with the vehicle. The method may include determining that a feature associated with the vehicle is in the media content, wherein the feature corresponds to the characteristic of the user. The method may include obtaining feature content associated with the feature based on feature information associated with the feature, wherein the feature information is stored in a data structure that includes information associated with the vehicle. The method may include performing an action associated with the media stream to enable the user to access the feature content when the feature is included within the media content.

According to some implementations, a device may include one or more memories, and one or more processors, communicatively coupled to the one or more memories, to detect that a user device is accessing a media stream, wherein the media stream enables the user device to display, via a user interface, media content associated with a subject. The one or more processors may receive a search query associated with the user device and the media stream, and determine, based on the search query, that a user associated with the user device has a threshold level of interest in a feature of the subject. The one or more processors may receive feature information associated with the feature based on determining that the user has the threshold level of interest in the feature, and receive feature content data, wherein the feature content data is associated with feature content that includes the feature information. The one or more processors may cause the feature content to be embedded into the media stream to cause the user device to display the feature content in relation to the feature when the feature is displayed in the media content via the user interface.

According to some implementations, a non-transitory computer-readable medium may store instructions that include one or more instructions that, when executed by one or more processors of a device, cause the one or more processors to identify a first search query sent from a first user device to a media platform. The one or more instructions may cause the one or more processors to detect that the media platform is providing a media stream to the first user device based on the first user device accessing a link to the media stream, wherein the link was provided to the first user device based on the media platform receiving the first search query, and wherein the media stream is configured to permit the first user device to display media content that includes images of a subject. The one or more instructions may cause the one or more processors to identify a first feature of the subject based on the first search query, and obtain first feature information associated with the first feature from a first data structure. The one or more instructions may cause the one or more processors to generate first feature content associated with the first feature, wherein the first feature content is configured to provide the first feature information. The one or more instructions may cause the one or more processors to cause the media content to include the first feature content by embedding data associated with the first feature content in the media stream, wherein the media content is configured to include the first feature content when a user interface of the first user device displays one or more of the images that includes the first feature.

DETAILED DESCRIPTION

Figure 1A:
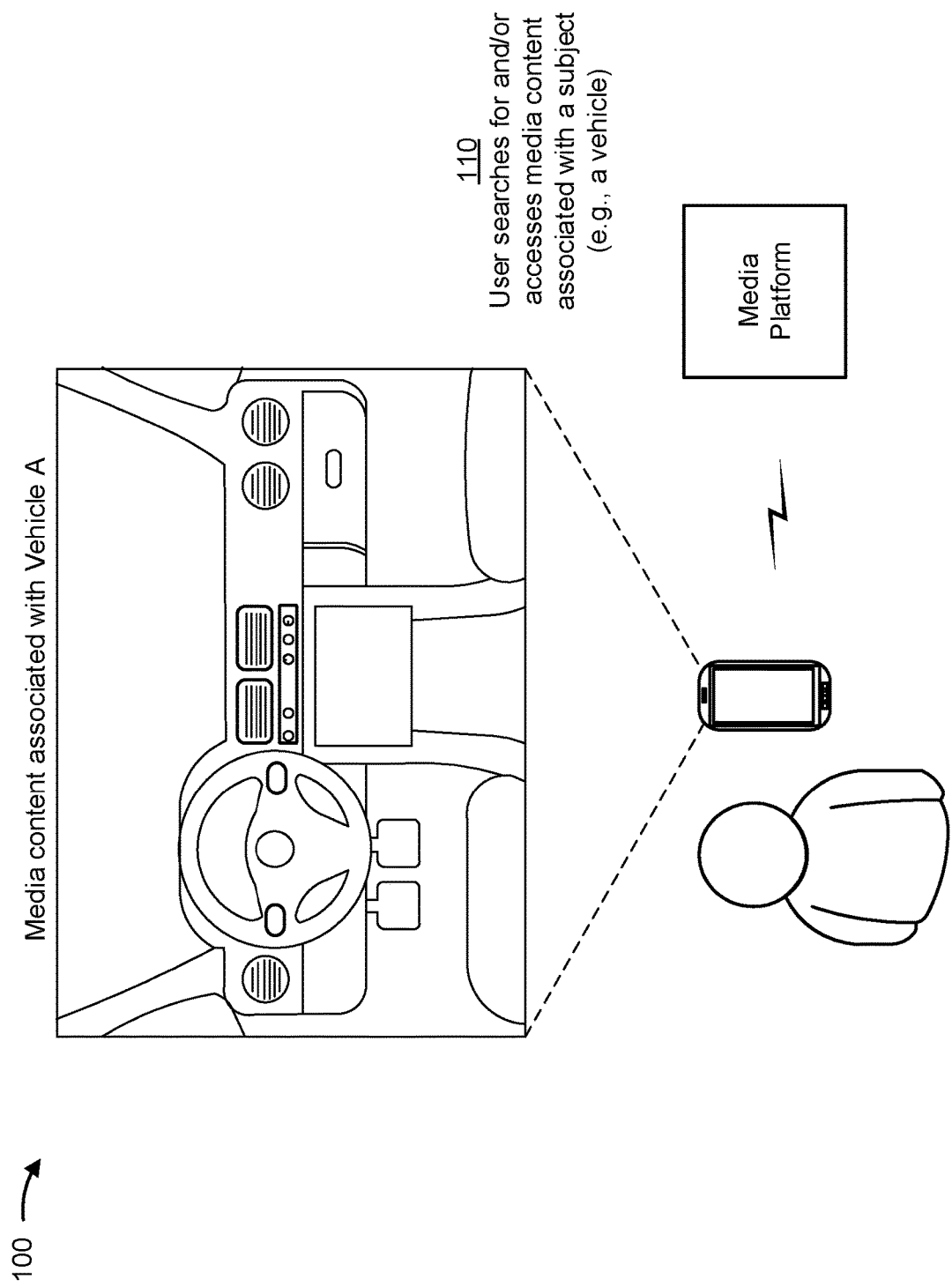
FIGS. 1A-1C are diagrams of an example implementation described herein.

The following detailed description of example implementations refers to the accompanying drawings. The same reference numbers in different drawings may identify the same or similar elements.

In some instances, a media platform may provide a media stream that can be streamed and/or broadcast to a plurality of users. The media stream may include an image stream (e.g., a series of images, such as a video stream), an audio stream, and/or the like that provides media content (e.g., images, audio, and/or the like) associated with a particular subject (e.g., a person, place, thing, organization, topic, and/or the like). The media stream is generally accessible to any user that has access to the media platform. However, any user that accesses the media stream is typically subjected to viewing whatever content is included within the media content.

In some cases, the media content may include feature content (e.g., text bubbles, images, supplemental audio, etc.) associated with features of the subject to provide additional information associated with the subject. In such cases, when an image of the subject is shown in the media content or the subject is mentioned in audio of the media content, the feature content can be provided to be included within the media content. However, such feature content is streamed and/or broadcast as part of the media stream (which may be provided by the media platform), and, therefore, any user that is accessing the media stream is subjected to whatever feature content is included in the media content.

According to some implementations described herein, a media content platform is provided that enables personalized viewing of feature content based on one or more characteristics of a user (and/or user device) that is accessing a media stream. In some implementations, the media content platform may determine that a user (and/or user device) is accessing a media stream, determine a characteristic of the user, identify media content of the media stream, determine that a feature associated with the characteristic of the user (e.g., a feature that is likely of interest to the user) is included in the media content, obtain feature content associated with the feature, and perform an action to permit the user to access the feature content via the media content. Accordingly, the media content platform may permit a media stream to be supplemented with data to provide feature content that is personalized for a specific user by embedding the data within the media stream such that a specific user can access the feature content via the media content.

In this way, feature content associated with a media stream can be customized for a user. Furthermore, feature content may not be included within a media stream that is broadcast to a particular user unless the feature content is determined to be of interest to the user (e.g., that the user is likely to be interested in the feature). Accordingly, some implementations described herein may conserve computing resources (e.g., processor resources, memory resources, and/or the like) and/or network resources that may otherwise be wasted by providing feature content that a user may not access and/or view because the user has little to no interest in the feature associated with the feature content. Furthermore, some implementations described herein enable a user to access additional information associated with a feature via the feature content without the user having to search for, navigate to, and/or access information provided in the feature content. In this way, some implementations described herein conserve computing resources and/or network resources that may otherwise have been used by a user to search for, navigate to, and/or access information that is provided in the feature content while accessing the media stream.

According to some implementations, feature content that is to be included within the media content may be automatically identified, obtained, generated, and/or provided via the media stream as described herein. For example, the media content platform may determine that the user is interested in a particular feature, identify information associated with the feature (e.g., a description of the feature, an image of the feature, such as a zoomed in image, a clickable hyperlink to additional information associated with the feature, and/or the like), generate feature content data for feature content that includes the information associated with the feature, and embed the feature content data in the media stream to permit the feature content to be accessible to the user. In this way, several different stages of the process for including feature content within media content are automated, which may remove human subjectivity and waste from the process, which may improve speed and efficiency of the process, and which may conserve computing resources (e.g., processor resources, memory resources, and/or the like). Furthermore, implementations described herein use a rigorous, computerized process to perform tasks or roles that were not previously performed. For example, previously, a technique did not exist to determine that a user is likely interested in a feature based on a characteristic of the user, identify information associated with the feature, generate feature content data for feature content that includes the information, and embed the feature content data in a media stream to permit the feature content to be accessible via media content of the media stream. Furthermore, automating the process for including feature content within media content of a media stream, as described herein, conserves computing resources (e.g., processor resources, memory resources, and/or the like) that would otherwise be wasted (e.g., by one or more users) when attempting to identify which feature should be highlighted to include feature content within media content, searching for feature information to be included within the feature content, and generating feature content data for the feature content, and/or the like.

Furthermore, some implementations described herein provide an enhanced user experience by permitting a user to access information associated with a feature within media content without the user having to search for, navigate to, and/or identify feature information associated with the feature. For example, the user may relatively quickly and seamlessly obtain information associated with the feature via media content that is being streamed to the user and/or accessed by the user. In this way, time resources of the user may be conserved, thus enhancing the user experience of accessing a media stream, relative to previous techniques.

As described herein, the media content platform may obtain information (e.g., online activity, interests, and/or the like) associated with the user and/or gain access to one or more data structures that include information associated with the user to determine a level of interest that a user may have in the feature. In such cases, the user may opt-in to a service in connection with one or more processes described herein to permit the media content platform to determine a level of interest that the user may have in a particular feature as described herein. Additionally, or alternatively, the user may opt-out of a service in connection with one or more processes described herein to prevent the media content platform from determining any level of interest that the user may have in a particular feature.

As used herein, a media stream may include any constant, continuous, or semi-continuous stream of media data (e.g., image data, audio data, text data, and/or the like). The media stream may be processed to render media content which may include images, audio, text, and/or the like. As described herein, media content may be associated with and/or rendered to provide images, audio, and/or information associated with a subject, such as a person, place, thing, topic, event, organization, and/or the like. The media content may be associated with live media (e.g., media captured in real-time or near real-time) and/or prerecorded media involving the subject. Furthermore, as described herein, the subject may include one or more features corresponding to one or more attributes of the subject, specifications of the subject, qualities of the subject, functions of the subject, and/or the like. As described herein, feature content may include images, audio, information, and/or the like that is specific to one or more features of the subject. The feature content may be rendered in association with the media content to highlight the feature and/or provide additional information associated with the feature when the feature is rendered (e.g., displayed in an image, mentioned in audio, described within a text feed, and/or the like) within the media content.

Figure 1B:
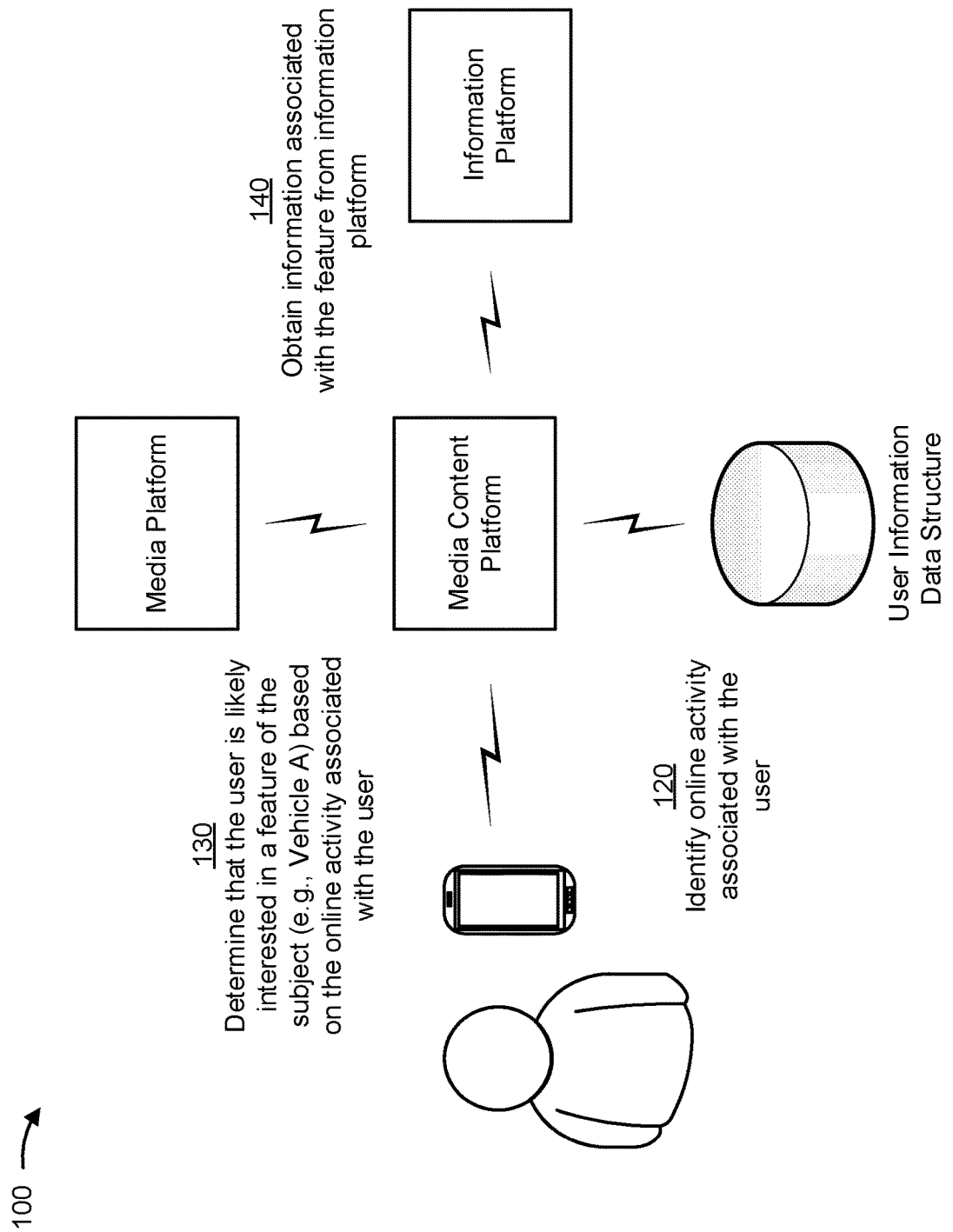
Figure 1C:
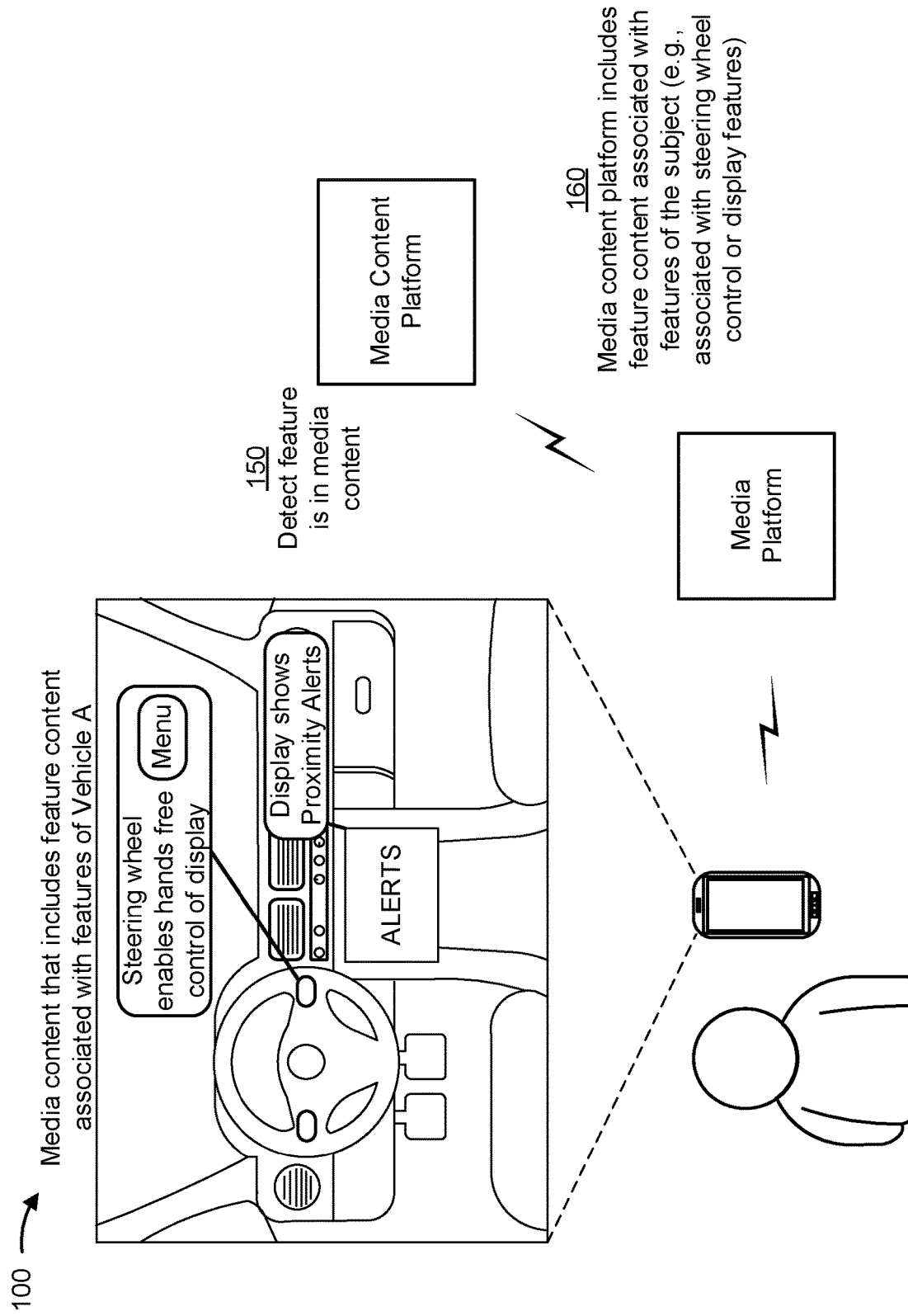

FIGS. 1A-1C are diagrams of an example implementation 100 described herein. Example implementation 100 includes a user device, a media platform, a media content platform, an information platform, and a user information data structure to enable personalized access to feature content via a media content of a media stream. As described herein, a user may access a media stream, that is broadcast and/or made available (e.g., stored, streamed, maintained, and/or the like) by the media platform, via the user device.

In some implementations, as described herein, the media content platform may supplement media content with feature content (e.g., using information from the information platform) associated with a feature that is determined to be of interest to a user of the user device (e.g., based on information in the user information data structure). Accordingly, as described herein, the media content platform may include (e.g., embed, supplement, add, and/or the like) feature content, associated with the one or more features, within the media content based on one or more characteristics associated with the user and/or user device (e.g., one or more characteristics that indicate a threshold level of interest in the features).

Example implementation 100 specifically references a user accessing media content associated with a vehicle, shown as Vehicle A, which may be referred to herein as "the vehicle." For example, the media stream may be associated with a virtual test drive of the vehicle (e.g., a live or real-time virtual test drive, a prerecorded virtual test drive, and/or the like). In such cases, the vehicle may be considered a "subject," as described herein. Accordingly, a media stream can be configured to provide media content associated with the vehicle, such as images from within the vehicle, as shown. Therefore, one or more features (e.g., a steering wheel, a display, a dashboard, one or more vents, one or more control pedals, and/or the like) of the vehicle can be rendered within the media content.

Although one or more of the following example implementations may reference media content associated with the vehicle and/or one or more features of the vehicle, any other suitable subject and/or suitable feature of a subject may similarly apply. For example, such implementations may similarly apply to a house and a feature of a house (e.g., a bedroom, a living room, a bathroom, and/or the like), an event (e.g., a race, a sporting event, a parade, a newscast, and/or the like) and a feature of the event (e.g., a sponsor of the event, a participant in the event, a location of the event, and/or the like), an organization (e.g., a business, a non-profit organization, a school, a governmental organization) and a feature of the organization (e.g., a mission, a service provided by the organization, a member of the organization, and/or the like), and so on.

As shown in FIG. 1A, and by reference number 110, a user searches for and/or accesses media content associated with a subject. For example, using the user device, the user may search for and/or access media content associated with a media stream provided and/or broadcast by the media platform. In some implementations, the user device may include an application that is associated with the media platform and/or access an application (e.g., a web-based application) that is associated with the media platform. For example, such applications may enable the user to search for media content via a search field that permits the user to enter a search query and/or search for the media content. Furthermore, the user device and/or the application may include a media player that is configured to play and/or display the media content via the user interface.

As mentioned above, the user device may receive a user input that includes a search query (e.g., the user input is entered into a search field of the application). The search query may be parsed to permit the user device, the media content platform, and/or the media platform to identify media streams that include media content associated with keywords in the search query. For example, one or more keywords of the search query may reference a subject and/or a feature of a subject. In example implementation 100, the search query may include a search for Vehicle A and/or a feature of Vehicle of A (such as steering wheel control, a display feature, and/or the like). Accordingly, a media stream (e.g., via a link to the media stream) that includes media content associated with the searched subject and/or the searched feature that is included in the search query may be made available to the user, provided to the user, and/or the like. As described herein, the media content platform may determine that the user has a threshold level of interest in a feature of the subject based on the search query.

In some implementations, the media stream may be accessed via any suitable communication protocol and/or communication network. For example, the user, via the user device, may access the media stream via a uniform serial locator (URL) associated with the media stream and/or the media platform. Additionally, or alternatively, the user, via the user device, may access the media stream via an application associated with the media stream and/or the media platform. In some implementations, the media stream may be accessed as a result of a search for specific media content. For example, a link to the media stream (e.g., a hyperlink to the URL of the media stream, a communication link to the media stream, and/or the like) may be provided to the user in a list of potential media streams that may be of interest to the user based on a search query received from the user (e.g., via the user device). On the other hand, in some implementations, the user may not access the media stream as a result of a search query. For example, the user may access a URL of the media stream while performing one or more online activities (e.g., browsing webpages, accessing social media, accessing email, and/or the like). In such cases, the URL may be made available to the user via the one or more online activities.

As described herein, the media platform may provide a media stream and/or enable access to a media stream via any suitable technique. In some implementations, the media platform may generate the media stream from one or more data streams generated and/or provided, to the media platform, by one or more media devices. For example, the media platform may generate the media stream from one or more image streams (e.g., generated from image data received from one or more image capture devices), one or more audio streams (e.g., generated from audio data received from one or more microphones), one or more information streams (e.g., generated from one or more speech-to-text devices, one or more really simple syndication (RSS) feeds, and/or the like), and/or the like. The media platform may maintain a database and/or a media access platform that permits the user to stream media content associated with the media stream. In this way, the media platform may provide and/or enable access to a media stream as described herein.

In some implementations, to detect that the user is searching for and/or accessing the media stream, the media content platform may monitor hundreds, thousands, millions, or more accounts (e.g., accounts associated with one or more applications of the user device and/or one or more applications associated with the media platform) associated with hundreds, thousands, millions, or more users and/or user devices that may be configured to access the media platform of example implementation 100 and/or any other similar media platform. Accordingly, the media content platform may process hundreds, thousands, millions, or more searches for media streams and/or accesses to media streams associated with the media platform and/or any other similar media platform.

In this way, the user and/or the user device may search for and/or access the media stream associated with the media platform to permit the media content platform to determine a characteristic of the user and provide user-specific feature content within media content associated with the media stream.

As shown in FIG. 1B, and by reference number 120, the media content platform identifies online activity associated with the user. In some implementations, the media content platform may receive the online activity from the user device, from the user information data structure, and/or from the media platform. The online activity associated with the user may include a search history associated with the user, a web browsing history associated with the user, social media activity associated with the user, past media accesses associated with the user, and/or the like. In some implementations, the online activity may include or correspond to a particular search that the user performed for the media stream. In such cases, the media content platform may identify one or more keywords (e.g., keywords representative of a particular subject and/or feature of a subject) of a search query submitted, via the user device, for the media stream.

In some implementations, a user may provide access information and/or enable monitoring of the user's online activity (and/or offline activity). For example, upon installation on the user device and/or on a browser of the user device, the application may request that the user authorize that online activity of the user device be monitored (e.g., by requesting that the user opt-in to having the media content platform monitor the online activity of the user). Such a request may indicate to the user that the monitoring is to enhance media access and/or media viewing experience. With the user's authorization of the monitoring of the user's online activity (e.g., received via a user input from the user), the application may periodically (e.g., hourly, daily, and/or the like) or aperiodically (e.g., based on an event, such as the user opening a browser, performing a search via the browser, shopping online, and/or the like) add activity data representative of the online activity associated with the user to the profile. Furthermore, the request may enable the user to opt out from being monitored by the application. According to some implementations, the user using the user device may be deemed to be an authorized user of an account associated with the application based on the user device being unlocked by the user. For example, the user may log onto the user device and/or into the application using a password, a biometric analysis (e.g., a fingerprint analysis, facial recognition, and/or the like), an authentication token, and/or the like. In some implementations, the application (and/or the account associated with the application) may be associated with a particular entity, such as an entity associated with the media platform and/or the media content platform, an entity associated with a subject of the media content (e.g., a manufacturer and/or dealer associated with Vehicle A), and/or the like.

In some implementations, the online activity may be monitored, stored, and/or maintained by the user device. For example, an application associated with the user device may track the online activity, store activity data representative of the online activity in a local storage device of the user device, and/or provide the activity data to the media content platform. The user device may provide the activity data periodically and/or based on a particular event (e.g., the user performing a search for media content, the user accessing a media stream, and/or the like). Accordingly, the media content platform may obtain the activity data from the user device.

In some implementations, the activity data may be unstructured data (e.g., data that is not organized and/or sorted in any particular manner, other than, perhaps, chronologically). For example, the user device may provide, to the media content platform, activity data associated with online activity and/or content of the online activity as unstructured data. Accordingly, the online activity may not be sorted according to any context of the online activity (e.g., by subject, feature, and/or the like), may not be sorted according to any source associated with the online activity (e.g., media platform, webpage, social media platform, and/or the like), and/or the like. In such cases, the media content platform and/or data processor associated with the user information data structure may organize, using any suitable technique, the unstructured data according to context of the online activity, source of the online activity, and/or the like to permit the media content platform to more quickly and/or easily identify (e.g., using a search engine associated with the user information data structure and/or media content platform) online activity associated with a particular feature of a particular subject. Additionally, or alternatively, the user device may store and/or provide activity data associated with the online activity as structured data (e.g., data that is organized according to subject, feature, source, and/or the like) associated with the user's online activity.

In some implementations, information (e.g., activity data) associated with the online activity, the user, and/or the user device, may be stored in the user information data structure. The user information data structure may be any suitable data structure such as a database, a table, an index, a graph, and/or the like. In some implementations, activity data may be provided and/or stored in the user information data structure by the user device, by a browser associated with the user device, by the media content platform, by the media platform, and/or the like periodically and/or as the user performs one or more corresponding online activities. Accordingly, the media content platform may obtain activity data associated with the online activity from the user information data structure. In some implementations, the user information data structure may store online activity for one or more profiles associated with one or more users and/or one or more accounts of the one or more users that are monitored and/or associated with an entity of media content platform. Accordingly, the user information data structure may store organized and/or structured data that can be navigated by the media content platform to identify the online activity of the user.

In some implementations, the media content platform may obtain online activity associated with the user from the media platform. For example, the media content platform may obtain a media access history associated with the user. In such cases, the media platform may maintain the media access history associated with the user. For example, the user may have a registered account with the media platform, and the media platform may track the media streams that are accessed by the user (or by the user device) via the registered account. More specifically, when the user is logged into the account (e.g., via an application associated with the media platform) and accesses media from the media platform, such a media access can be tracked and/or stored in association with the account). Additionally, or alternatively, the media platform may provide a media search history associated with the user. In such cases, the media platform may track and/or store search queries, submitted by the user, to the media platform for particular media content.

Referring to example implementation 100, activity data that is representative of online activity associated with Vehicle A and/or one or more features of Vehicle A may be obtained by the media content platform (e.g., from the user device, from the user information data structure, and/or from the media platform). As described herein, such online activity may include past searches for media content associated with one or more features that are associated with a feature of Vehicle A, past browsed webpages associated with one or more features that are associated with a feature of Vehicle A, past social media activity (e.g., likes, mentions, and/or the like) associated with one or more features that are associated with a feature of Vehicle A, past accessed media streams (and/or media platforms) associated with one or more features that are associated with a feature of Vehicle A, and/or the like.

As described herein, the online activity may correspond to and/or be indicative of a level of interest of the user. For example, the online activity may be used, by the media content platform, to determine that the user has a threshold level of interest in a particular feature of a subject. Additionally, or alternatively, the online activity may be indicative of a particular characteristic of the user. For example, the activity may indicate that the user may have a use and/or need for a particular feature of a subject, though the user may not have a particular level of interest in the particular feature. More specifically, the online activity may indicate one or more characteristics of the user (e.g., physical traits, familial traits, and/or the like) that correspond to one or more features of a subject. For example, the media content platform may determine that the user is a relatively large individual (e.g., based on online searches for "big and tall" clothing), or has a relatively large family (e.g., based on searching for family vacations, or interacting with family-themed activities on social media, and/or the like). As described herein, the media content platform may use the level of interest and/or related characteristics of the user to identify one or more features of media content that are likely of interest to the user.

In this way, the media content platform may identify activity associated with the user to permit the media content platform to determine that the user is likely interested in a particular feature of a subject of the media content (e.g., in a steering wheel control and/or a display feature of a vehicle).

As further shown in FIG. 1B, and by reference 130, the media content platform determines that the user is likely interested in a feature of the subject based on the online activity associated with the user. For example, based on the online activity, the media content platform may identify a feature that may be of interest to the user and determine whether such a feature may be included within the media content.

In some implementations, the media content platform may identify and/or analyze a subject of the media content to determine one or more features of the subject that may be included within media content of a media stream. For example, the media content platform may access metadata associated with the media stream and/or media content. Such metadata may include identifiers (e.g., a title, a subtitle, one or more tags, one or more annotations, one or more comments, one or more reviews, and/or the like) that indicate that the media content includes content on a subject and/or one or more features of the subject. Additionally, or alternatively, the media content platform may identify the subject of the media content (e.g., based on the metadata, based on an analysis of the media content, and/or the like), and determine one or more features of the subject. For example, the media content platform may perform a search (e.g., using a search query that requests information associated with the subject) of the information platform, which may include feature information associated with features of the subject. The information platform may include one or more platforms associated with the media platform (e.g., a database that stores feature information associated with the subject of the media content), one or more platforms (e.g., a database and/or website) associated with an entity that is associated with the subject (e.g., a manufacturer of Vehicle A, a dealership that is selling Vehicle A, and/or the like), one or more search engine platforms, and/or the like. In some implementations, the search may be a generic search of any or all features of the subject. Additionally, or alternatively, the media content platform may perform a focused search of specific features (e.g., features that are determined to be of interest to the user as described herein) of the subject. Such a focused search may conserve any computing resources and/or network resources that may otherwise be wasted searching for, navigating to, and/or obtaining information associated with features that are likely not of interest to the user.

Referring to the example of implementation 100, the media content platform may identify that the subject of the media content is Vehicle A. For example, based on the media content platform identifying an identifier of Vehicle A in metadata associated with the media stream of the media content, based on the media content platform identifying or recognizing that an identifier of Vehicle A is mentioned in the media content (e.g., using a natural language processing analysis, and/or the like), based on the media content platform identifying the identifier and/or recognizing Vehicle A in an image of the media content (e.g., using an object recognition analysis of the media content), the media content platform may perform a search for features of Vehicle A that queries the information platform for feature information associated with the subject. Accordingly, such a search may result in the media content platform identifying that Vehicle A has one or more steering wheel controls and/or one or more display features (e.g., alert features).

In some implementations, the media content platform may use a machine learning model, such as a feature recognition model, to identify a feature within media content. For example, media content platform may train the feature recognition model based on one or more parameters associated with identifying a feature, such as an image of the feature, an identifier of the feature, a subject associated with the feature, a type of the subject associated with the feature, a type of the feature, a type of the media content (e.g., image content, audio content, and/or the like), and/or the like. The media content platform may train the feature recognition model, according to the one or more parameters, using historical data associated with identifying the feature or identifying one or more other features within the media content and/or within other media content that includes the subject and/or one or more other subjects. Using the historical data and the one or more parameters as inputs to the machine learning model, the media content platform may identify one or more features in media content to permit feature information associated with the feature to be obtained and/or feature content associated with the feature to be included within the media content.

As described herein, the media content platform may determine a level of interest, that the user may have in a particular feature, based on the online activity of the user. For example, as described herein, activity data associated with the feature may indicate that the user has searched for the feature, reviewed the feature, accessed web pages associated with the feature, performed social media activity associated with the feature, and/or the like. Accordingly, based on an analysis of the activity data that is representative of online activity of the user, the media content platform may determine a level of interest that the user may have in a feature of a subject of media content.

In some implementations, the level of interest of the user may be determined based on a received search query. For example, a search query for "Vehicle A's steering wheel controls" may indicate a likelihood that the user is interested in a steering wheel feature or steering control functions of a steering wheel of Vehicle A. Additionally, or alternatively, the level of interest may be determined based on a search history associated with the user and/or the user device. For example, the level of interest may be determined from a most recent number of searches, searches made during a particular time period (e.g., a most recent hour, a most recent day, a most recent week, and/or the like). In this way, the media content platform may determine a level of interest that the user may have in Vehicle A and/or in a particular feature of Vehicle A based on a particular search for Vehicle A, based on a search for the particular feature of Vehicle A, based on a quantity of searches associated with Vehicle A, based on a quantity of searches associated with the feature of Vehicle A, and/or the like.

As described herein, the media content platform may determine that the user is likely interested in a feature based on a determined characteristic of the user (e.g., as determined from the online activity) and/or a determined characteristic of the feature (e.g., as determined from feature information of the feature). From such characteristics, the media content platform may determine a level of interest that the user may have in the feature. Referring to the example above, based on the online activity indicating that the user is relatively large, physically, the media content platform may determine that one or more features (e.g., features of a subject in the media content) that are amenable to large individuals may be of interest to the user (e.g., adjustable steering wheel of Vehicle A, adjustable pedals of Vehicle A, adjustable seats of Vehicle A, and/or the like of the vehicle). Furthermore, based on the online activity indicating that the user has a family, the media content platform may determine that one or more features that are amenable to families (e.g., passenger features of Vehicle A, features that make Vehicle A versatile, and/or the like).

In some implementations, the media content platform may measure the amount of the user's online activity that is associated with a particular feature to determine the level of interest that the user may have in the feature. Such a measure may include a number and/or frequency of search queries submitted, web pages accessed, reviews accessed, mentions and/or likes made in social media, and/or the like that include and/or are associated with the feature. Accordingly, the media content platform, once the amount of online activity satisfies a threshold, may determine that the user has a threshold level of interest in the feature and that the user likely has a desire to view additional information associated with the feature. In some implementations, such a threshold may be specific to a user, specific to a subject of the media content, specific to a feature of the subject, and/or the like. Such thresholds may be based on historical data and/or information associated with a user's accessing media associated with the subject and/or the feature.

In some implementations, the media content platform may use a machine learning model, such as a user interest model, to determine a level of interest of the user. For example, the media content platform may train the machine learning model based on one or more parameters associated with determining a likelihood that the user and/or one or more other users are interested in a particular subject and/or feature of the subject, such as a search query associated with the subject and/or features of the subject, a search history associated with the subject and/or features of the subject, an online activity associated with the subject and/or features of the subject, and/or the like. The media content platform may train the user interest model, according to the one or more parameters, using historical data associated with measuring the level of interest of the user and/or one or more other users. Using the historical data and the one or more parameters as inputs to the machine learning model, the media content platform may determine the user's level of interest in a subject and/or a feature of a subject to permit the media content platform to identify the feature and/or obtain feature information associated with the feature to provide feature content associated with the feature within the media content provided by the media platform.

Accordingly, in example implementation 100, the media content platform may analyze search queries and/or online activity associated with Vehicle A and/or a feature of Vehicle A to determine the likelihood that the user is interested in a particular feature of Vehicle A. For example, the media content platform may determine that the user is likely interested in a feature of Vehicle A based on frequent access to one or more webpages about Vehicle A and/or the feature of Vehicle A, from frequent access to one or more reviews of Vehicle A and/or the feature of Vehicle A, from one or more mentions or likes of Vehicle A and/or the feature of Vehicle A in social media, and/or the like.

In this way, the media content platform may determine that the user is likely interested in a feature of the subject in the media content to permit the media content platform to obtain feature information associated with the feature from the information platform and/or media platform.

As further shown in FIG. 1B, and by reference number 140, the media content platform obtains information associated with the feature (which may be referred to herein as "feature information") from the information platform. In some implementations, the media content platform may obtain the feature information from the media platform (e.g., the feature information may be stored as metadata, associated with the media stream, that is maintained by the media platform).

As mentioned above, the media content platform may perform a search of the information platform to identify feature information associated with the feature. Once found, the media content platform may obtain the feature information from the information platform. Additionally, or alternatively, the media content platform may access the information platform to obtain the feature information from the information platform.

As shown in FIG. 1C, and by reference number 150, the media content platform may determine that the feature is included (i.e., that there is image or audio data related to the feature that is included) in the media content. For example, because the media content may include images and/or audio that does not always include the feature (e.g., due to a field of view of an image capture changing to include or not include the feature, audio mentioning and/or not mentioning the feature, and/or the like), the media content platform may detect when the feature is included within the media content to permit the media content platform to include feature content associated with the feature in the media content.

The media content platform may determine that the feature is included in the media content based on one or more characteristics of the media stream. For example, metadata of the media stream may indicate one or more coordinates associated with a field of view of an image capture device that is providing images of the media stream and/or a field of view of the media content (e.g., a view of the multiple views of the media content and/or of the subject of media content). Based on the one or more coordinates and/or coordinates of the one or more features (which may be known or determined from the feature information), the media content platform may determine when the feature is included in the media content (e.g., the media content that is being accessed by the user). Additionally, or alternatively, the media content platform may perform an object recognition analysis (e.g., via an image processing technique) and/or natural language processing analysis (e.g., via audio recognition, speech-to-text, and/or the like) of the media content to determine when the feature is included in an image of the media content and/or audio of the media content. The object recognition analysis and/or natural language processing analysis may be configured to recognize the feature based on the obtained feature information (e.g., an image of the feature information, a name or identifier of the feature, and/or the like).

In this way, the media content platform may determine that the feature is included in the media content, in order to permit feature content associated with the feature to be included in the media content.

As further shown in FIG. 1C, and by reference number 160, the media content platform includes feature content associated with one or more features of the subject in the media content. For example, the media content platform may embed the feature content into the media content by appending feature content data associated with the feature content into the media stream and/or editing the media stream to include the feature content data. In some implementations, the media content platform may determine a location within a structure of the media stream that is to include the feature content data. For example, the location may correspond to a location that includes media content that includes the feature (or a view of the feature). The media content platform may embed or insert the feature content data at the corresponding location of the structure of the media stream to ensure that the feature content is displayed and/or discussed within the media content when the media content includes the feature.

In some implementations, the media content platform may generate the feature content for the feature. For example, the media content platform may generate the feature content using the obtained feature information. The feature content may be generated to be in a suitable format to permit the feature information to be included in the feature content. For example, the media content platform may process the feature information, generate feature content (e.g., an image of the feature information, a text bubble of the feature information, an image of the feature, and/or the like) to permit the feature content to be embedded within the media content. Correspondingly the media content platform may generate feature content data to cause the feature content to be included within the media stream.

In some implementations, the media content platform may use a machine learning model, such as a feature content model, to generate and/or obtain feature content, for a feature of a subject, that is to be included in the media content. For example, the media content platform may train the feature content model based on one or more parameters associated with generating and/or obtaining the feature content, such as the type of the feature, a characteristic of the user (e.g., a preference of the user, a determined level of interest in the feature, and/or the like), the type of media content, a characteristic of the subject (e.g., type of subject, location of the subject, and/or the like), associated with the feature, a language associated with the media content, and/or the like. The media content platform may train the feature content model, according to the one or more parameters, using historical data associated with generating and/or obtaining feature content associated with the feature and/or one or more other features, associated with the subject and/or one or more other subjects, associated with the media content and/or other media content, and/or the like. Using the historical data and the one or more parameters as inputs to the feature content model, the media content platform may generate feature content to permit the feature content to be embedded within the media content.

In some implementations, the media content platform may augment the feature content within the media content such that the feature content is placed proximate the feature within the media content regardless of the field of view of the media content. For example, the media stream may include a multi-view image stream generated using a multi-direction image capture device (e.g., a 360 degree camera, an omnidirectional camera, and/or the like). Accordingly, the field of view of the media content may be limited to a portion of the field of view captured by the multi-direction image capture device. In some implementations, the user (e.g., using the user device) may control the field of view of media content by panning in one or more directions relative to the subject of the media content and/or relative to the feature of the media content. Therefore, based on determining the location and/or presence of the feature within the field of view of the media content when the user pans the field of view such that the media content includes the feature, the media content platform may include the feature content data within the media stream to cause the feature content to remain fixed within the media content relative to the corresponding feature. Therefore, whenever the field of view of the media content includes the feature, the embedded feature content can be included within the media content.

As shown in example implementation 100, the feature content may include a text bubble and/or a callout to the features of Vehicle A that may be of interest to the user. For example, if the media content platform determines that the user is likely interested in the steering wheel controls, feature content can be included (e.g., overlaid or superimposed) in the media content that indicates that the user may have hands free control of the display using the steering wheel controls. Furthermore, the feature content may include an image (e.g., a zoomed in image) of the feature to highlight the feature and/or provide a different perspective of the feature (a perspective that is different from that of the image capture device used to generate image data for the media stream). As further shown in example implementation 100, a second text bubble may be included to indicate, for example, that the display shows proximity alerts, indicating, to the user, that when the vehicle is close to an object an alert may be displayed on the display feature of the vehicle.

In some implementations, the media content platform may be configured to remove the feature content from the media content (and/or feature content data from the media stream) when the feature is not included within the media content that is being accessed by the user. For example, the media content platform may determine that a field of view of the media content does not include the feature, and therefore may remove the feature content from the media content and/or remove the feature content data from the media stream. Accordingly, in such cases, the media content platform may conserve computing resources and/or network resources associated with receiving and/or processing feature content data that is associated with a feature that is not included within the media content that is being accessed (e.g., displayed) by the user device.

In this way, the media content platform may provide personalized feature content for the user, as described herein.

As indicated above, FIGS. 1A-1C are provided merely as an example. Other examples may differ from what is described with regard to FIGS. 1A-1C.

Figure 2:
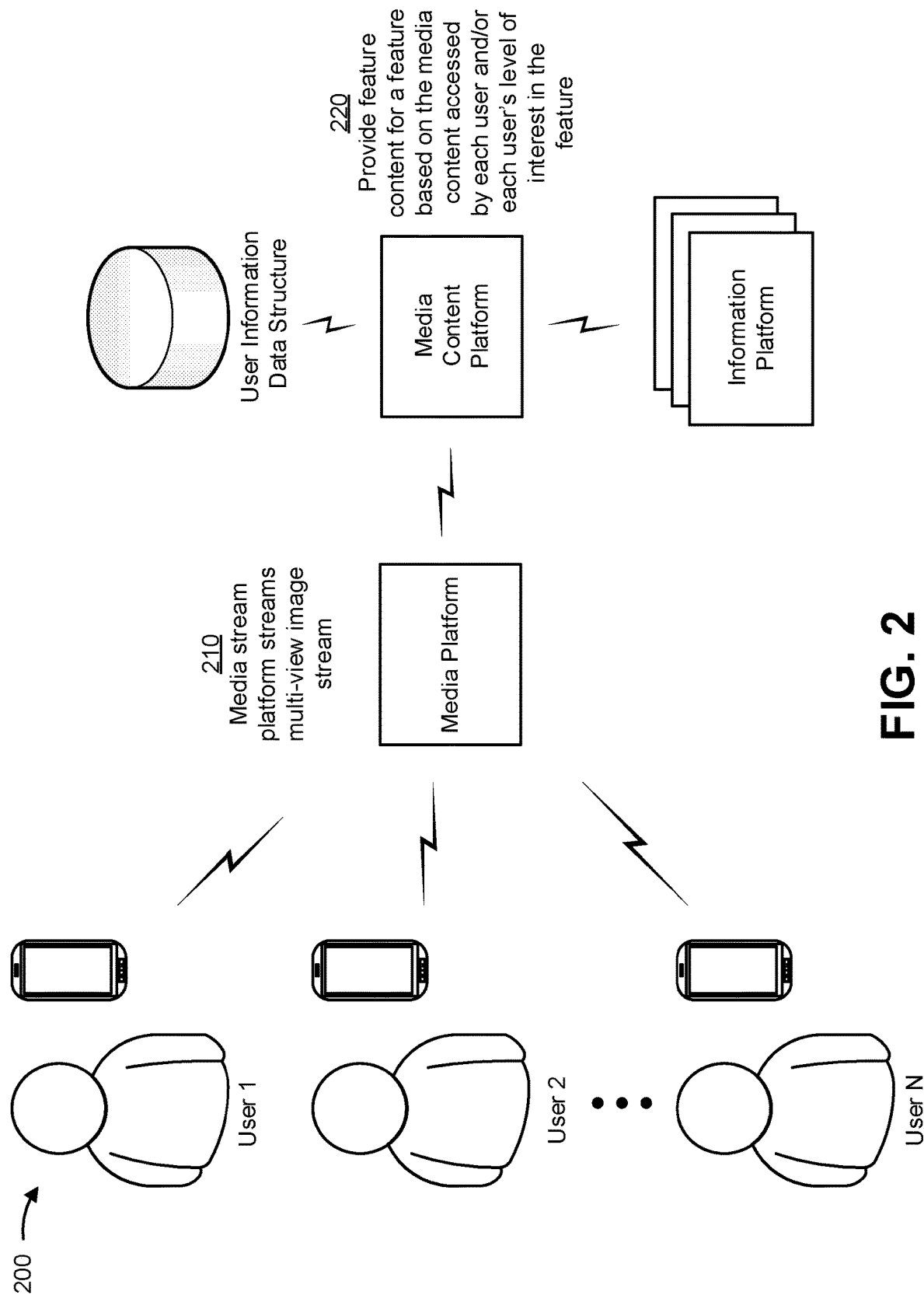
FIG. 2 is a diagram of an example implementation described herein.

FIG. 2 is a diagram of an example implementation 200 described herein. Example implementation 200 includes a plurality of user devices associated with a plurality of users (shown as User 1 to User N, where N≥1 and is an integer), a media platform, a media content platform, one or more information platforms, and a user information data structure. The media content platform of example implementation 200 may use the one or more information platforms and/or the user information data structure in a similar manner as the information platform and user information data structure of example implementation 100.

As shown in FIG. 2, and by reference number 210, the media platform streams a multi-view image stream to the plurality of users. The multi-view image stream may be a live (e.g., a real-time or near real-time) multi-view image stream and/or a prerecorded multi-view image stream. The multi-view image stream, as described herein, may permit each of the plurality of users to view different media content (e.g., different views or angles of a subject of the media content) that may be rendered from different media data of the multi-view image stream. Each of the plurality of users may view the different media content by providing user inputs via a user interface of the user device (e.g., a user interface associated with an application and/or media player of the user device). Accordingly, while User 1 may be accessing media content that includes a view of a steering wheel of a vehicle, User 2 may be accessing media content that includes a view of a display feature of the vehicle. Furthermore, the media content platform may determine one or more individual features, associated with a subject of the multi-view media stream, that may be of particular interest to each of the plurality of users. For example, User 1 may be interested in a first feature of the subject while User 2 may be interested in a second feature of the subject that is different from the first feature.

According to some implementations, the media content platform may monitor hundreds, thousands, millions, or more user inputs (e.g., to control the field of view), associated with the media content of the multi-view media stream, that are received by hundreds, thousands, millions, or more user devices that may provide different views of the subject of media content, and/or the like. In this way, the media content platform may process hundreds, thousands, millions, or more views of the subject that may include hundreds, thousands, or more features of the subject. Further, the media content platform may embed feature content corresponding to the hundreds, thousands, or more features within the hundreds, thousands, millions or more views of the media content of the multi-view media stream. Furthermore, the media content platform may perform the same or similar processes as described herein for the media content of example implementation 100 for hundreds, thousands, or more media streams.

In this way, the media content platform may monitor a multi-view image stream that is streamed to a plurality of users and determine features that are of interest to each of the plurality of users, as described herein, to permit the media content platform to provide personalized feature content to the plurality of users.

As further shown in FIG. 2, and by reference number 220, the media content platform provides feature content for a feature based on the media content that is accessed by each user (e.g., based on what each user is viewing) and/or each user's level of interest (e.g., determined as described herein) in the feature. In this way, a personalized and/or unique viewing experience of the multi-view media stream can be achieved. For example, referring to the above example, because User 1 is viewing the steering wheel, feature content associated with steering wheel controls may be embedded in the media content being accessed by the user device of User 1. Furthermore, because User 2 is viewing the display feature, feature content associated with the display feature may be embedded in the media content being accessed by the user device of User 2.

As another example, in some implementations, the media content platform may determine that both User 1 and User 2 are accessing media content that includes the steering wheel. In such an example, the media content platform may have determined that User 1 has a threshold level of interest in the steering wheel controls and User 2 does not have the threshold level of interest in the steering wheel controls. Accordingly, the media content platform may cause feature content associated with the steering wheel controls to be embedded in the media content that is being accessed by the user device of User 1 (e.g., by adding feature content data and/or causing feature data to be added to the multi-view media stream that is streamed to user 1) but not embed the feature content (and/or prevent the feature content from being included) in the media content that is being accessed by the user device of User 2.

In this way, the media content platform may provide personalized feature content associated with one or more features of a subject that is included within media content of a media stream.

As indicated above, FIG. 2 is provided merely as an example. Other examples may differ from what is described with regard to FIG. 2.

Figure 3:
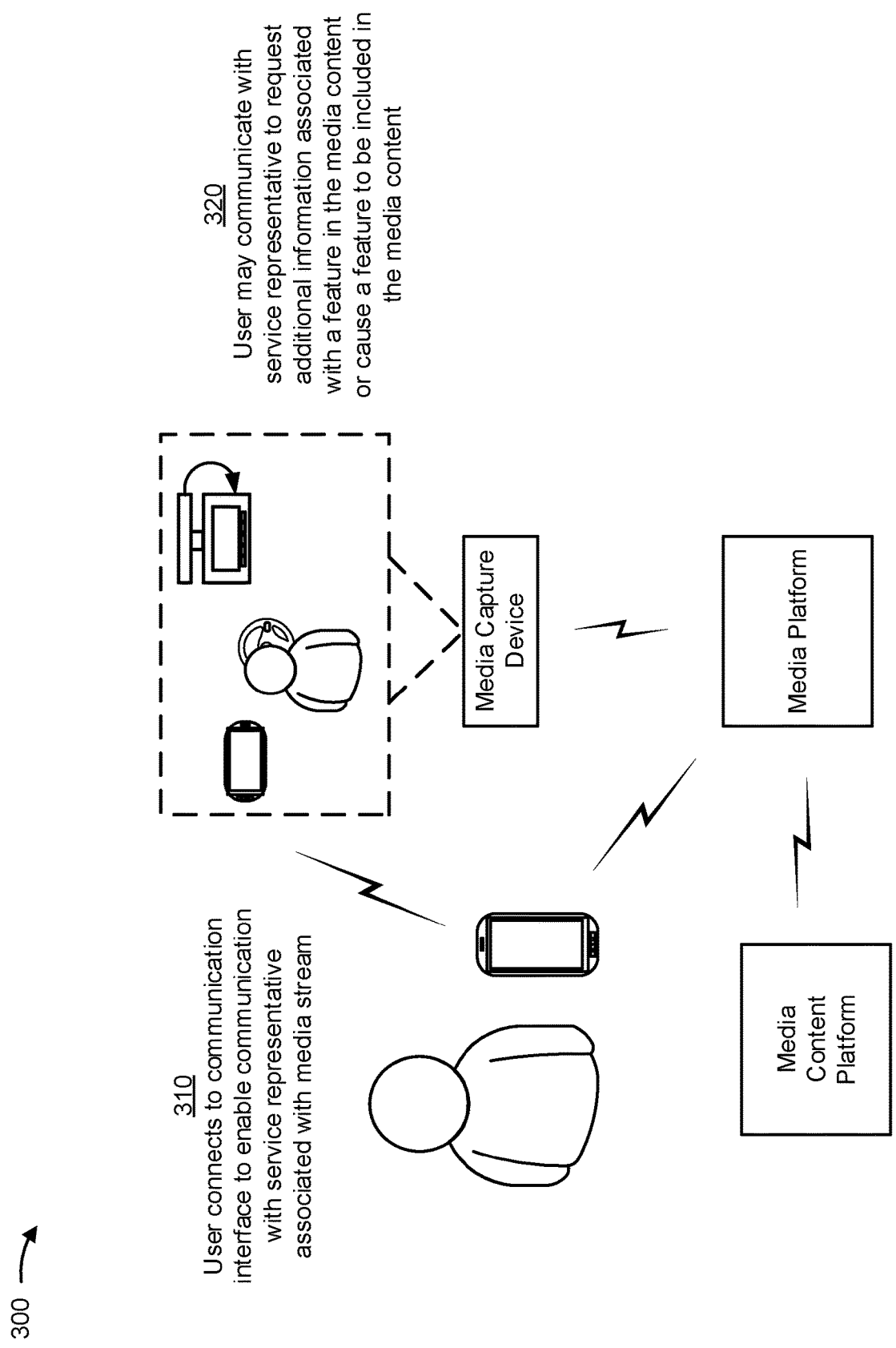
FIG. 3 is a diagram of an example implementation described herein.

FIG. 3 is a diagram of an example implementation 300 described herein. Example implementation 300 includes a user device, a media platform, a media content platform, and a media capture device. As shown in FIG. 3, the media capture device may be capturing images and/or audio (e.g., in real-time) of an environment that is to be provided in a media stream to the user device (e.g., in real-time and/or near real-time). The images and/or audio may include images of a service representative (e.g., a driver of a vehicle), sounds from the environment (e.g., sounds made by the service representative, sounds made by the vehicle, and/or the like). Accordingly, the user may access the media stream via the user device to view the environment. The service representative may have access to a service representative device that permits the service representative to receive messages (e.g., from the user device of the user). In some implementations, the service representative may communicate with the user via the media stream (e.g., by speaking) and/or sending one or more messages via the service representative device. In the example of FIG. 3, the service representative may be performing a virtual test drive that can be viewed and/or accessed, via the user device, by the user and/or hundreds, thousands, or millions of other users, as described herein.

As shown in FIG. 3, and by reference number 310, the user connects to a communication interface (e.g., a chat interface, a voice call interface, and/or the like) to enable the user to communicate with the service representative. The communication interface may permit the user to send text-based messages (e.g., comments associated with the media stream, instant messages, text messages, emails, and/or the like), voice messages, and/or the like to the service representative to permit the user to interact (e.g., in real-time or near real-time) with the service representative.

As further shown in FIG. 3, and by reference 320, the user may communicate with the service representative to request additional information associated with a feature in the media content and/or to cause a feature to be included in the media content. For example, the user, via the communication interface, may request the service representative to discuss or talk about a particular feature of the vehicle, to perform a certain maneuver to demonstrate a feature of the vehicle, and/or the like, which can then be viewed by the user via the media content. Additionally, or alternatively, the user may request, via the communication interface, the service representative to display one or more features of the vehicle (e.g., one or more features that may be hidden from view). For example, as shown, the service representative may open or drop down an entertainment console of the vehicle to permit the user to see a different perspective of the entertainment console.

In some implementations, the media content platform may provide feature content associated with information that is requested by the user. For example, the media content platform may detect that the service representative is discussing a particular feature and the service representative may provide feature content associated with the feature, as described herein, within the media content. Additionally, or alternatively, the media content platform may cause a media capture device to automatically pan and/or zoom to a particular feature that is requested by the user and/or discussed by the service representative. For example, the media content platform, based on characteristics of the feature (e.g., the location of the feature relative to the media capture device, an appearance of the feature, and/or the like) determined from the feature information, may identify the feature within the media stream, include the feature within the media content provided to the user, and/or provide feature content associated with the feature to the user.

In this way, the media content platform may enable and/or facilitate interaction between the user and/or a service representative and provide enhanced control and/or personalized viewing of a media stream, as described herein.

As indicated above, FIG. 3 is provided merely as an example. Other examples may differ from what is described with regard to FIG. 3.

Accordingly, as described herein, a media content platform may include feature content within media content provided by a media platform. The feature content may be selectively generated and/or selectively included within the media content based on one or more characteristics of the user that is accessing and/or receiving the media content. In this way, custom or personalized feature content can be included within media content that is provided to a user. The feature content provided to the user may correspond to a feature that may be of interest to the user. Therefore, computing resources and/or network resources that may otherwise be used to send feature content associated with a feature that is not of interest to the user are conserved. Furthermore, computing resources and/or network resources that may otherwise be used (e.g., by the user) to search for, navigate to, identify, and/or access the feature content through other platforms or other means (e.g., other than the media content) are conserved. In some implementations, the media content platform may embed the feature content (feature content data) within the media content downstream from the media platform, such that network resources between the media platform and the media content platform can be conserved because the media platform may not include such feature content.

Figure 4:
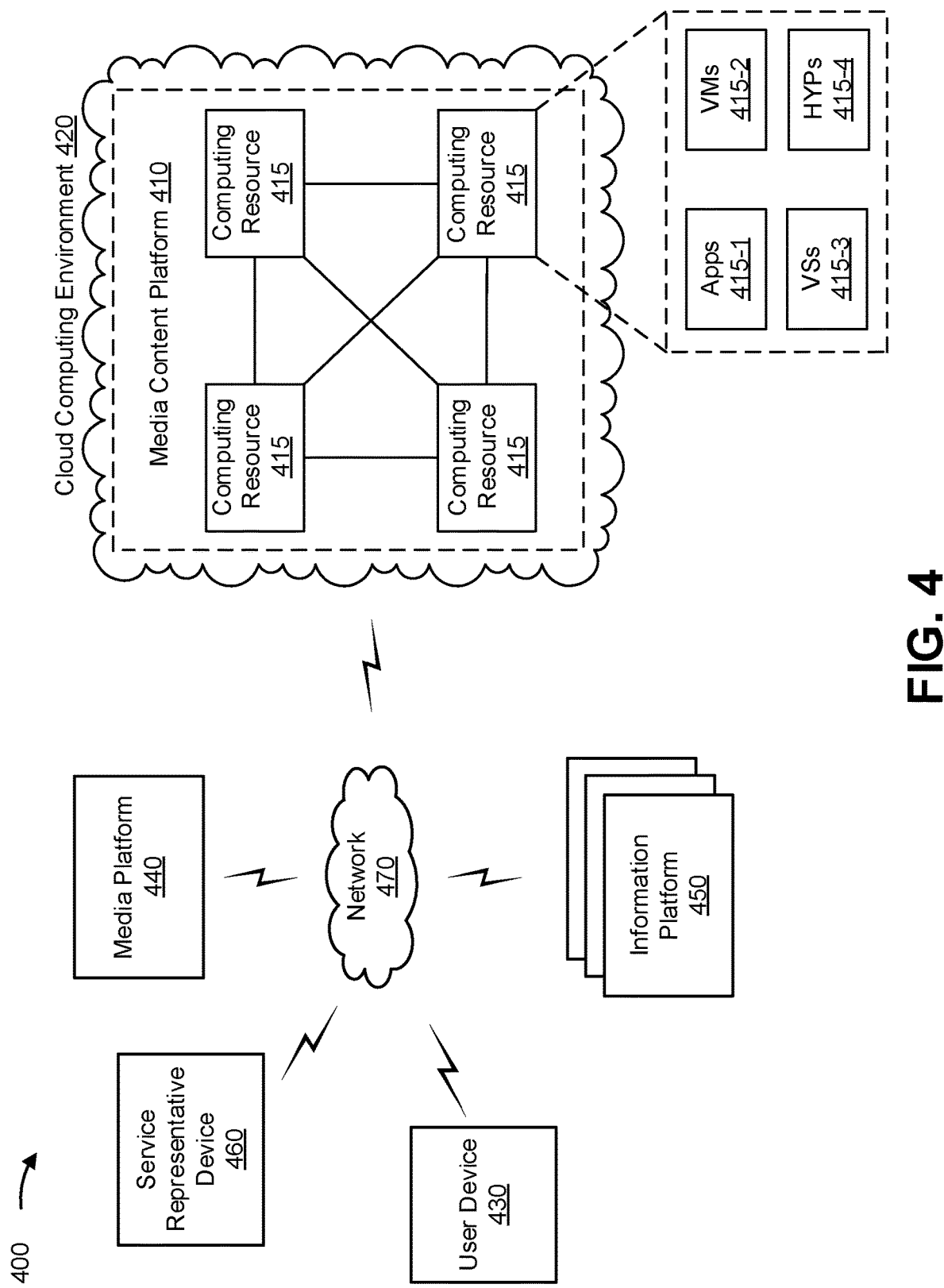
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a media content platform 410, a computing resource 415, a cloud computing environment 420, a user device 430, a media platform 440, an information platform 450, a service representative device 460, and a network 470. Devices of environment 400 may interconnect via wired connections, wireless connections, or a combination of wired and wireless connections.

Media content platform 410 includes one or more computing resources assigned to enable personalized viewing of feature content based on one or more characteristics of a user (and/or user device) that is accessing a media stream. For example, media content platform 410 may be a platform implemented by cloud computing environment 420 that may identify online activity associated with the user, determine that the user is likely interested in a feature of the subject based on the online activity associated with the user, obtain information associated with the feature from information platform 450, determine that the feature is included in the media content, and/or include feature content associated with the features of the subject in the media content. In some implementations, media content platform 410 is implemented by computing resources 415 of cloud computing environment 420.

Media content platform 410 may include a server device or a group of server devices. In some implementations, media content platform 410 may be hosted in cloud computing environment 420. Notably, while implementations described herein describe media content platform 410 as being hosted in cloud computing environment 420, in some implementations, media content platform 410 may be non-cloud-based or may be partially cloud-based.

Cloud computing environment 420 includes an environment that delivers computing as a service, whereby shared resources, services, etc., may be provided to user device 430, media platform 440, information platform 450, and/or service representative device 460. Cloud computing environment 420 may provide computation, software, data access, storage, and/or other services that do not require end-user knowledge of a physical location and configuration of a system and/or a device that delivers the services. As shown, cloud computing environment 420 may include media content platform 410 and computing resource 415.

Computing resource 415 includes one or more personal computers, workstation computers, server devices, or another type of computation and/or communication device. In some implementations, computing resource 415 may host media content platform 410. The cloud resources may include compute instances executing in computing resource 415, storage devices provided in computing resource 415, data transfer devices provided by computing resource 415, etc. In some implementations, computing resource 415 may communicate with other computing resources 415 via wired connections, wireless connections, or a combination of wired and wireless connections.

As further shown in FIG. 4, computing resource 415 may include a group of cloud resources, such as one or more applications ("APPs") 415-1, one or more virtual machines ("VMs") 415-2, virtualized storage ("VSs") 415-3, one or more hypervisors ("HYPs") 415-4, or the like.

Application 415-1 includes one or more software applications that may be provided to or accessed by user device 430. Application 415-1 may eliminate a need to install and execute the software applications on user device 430. For example, application 415-1 may include software associated with media content platform 410 and/or any other software capable of being provided via cloud computing environment 420. In some implementations, one application 415-1 may send/receive information to/from one or more other applications 415-1, via virtual machine 415-2.

Virtual machine 415-2 includes a software implementation of a machine (e.g., a computer) that executes programs like a physical machine. Virtual machine 415-2 may be either a system virtual machine or a process virtual machine, depending upon use and degree of correspondence to any real machine by virtual machine 415-2. A system virtual machine may provide a complete system platform that supports execution of a complete operating system. A process virtual machine may execute a single program, and may support a single process. In some implementations, virtual machine 415-2 may execute on behalf of a user (e.g., user device 430), and may manage infrastructure of cloud computing environment 420, such as data management, synchronization, or long-duration data transfers.

Virtualized storage 415-3 includes one or more storage systems and/or one or more devices that use virtualization techniques within the storage systems or devices of computing resource 415. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 415-4 provides hardware virtualization techniques that allow multiple operating systems (e.g., "guest operating systems") to execute concurrently on a host computer, such as computing resource 415. Hypervisor 415-4 may present a virtual operating platform to the guest operating systems, and may manage the execution of the guest operating systems. Multiple instances of a variety of operating systems may share virtualized hardware resources.

User device 430 includes one or more devices capable of receiving, generating, storing, processing, and/or providing information associated with receiving a media stream (e.g., associated with a vehicle), providing (e.g., playing, displaying, and/or the like) content associated with the media stream, and/or the like. For example, user device 430 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Media platform 440 includes a server device (e.g., a host server, a web server, an application server, etc.), a data center device, or a similar device capable of providing a media stream that can be broadcast, streamed, and/or made accessible to a plurality of users. In some implementations, media platform 440 may maintain and/or provide a media access history associated with the user, maintain and/or provide a media search history associated with the user, and/or the like.

Information platform 450 includes a server device (e.g., a host server, a web server, an application server, etc.), a data center device, or a similar device capable of maintaining information associated with a feature. In some implementations, information platform 450 may store the information, maintain the information, update the information, generate the information, and/or provide the information to media content platform 410.

Service representative device 460 includes one or more devices capable of receiving, generating, storing, processing, and/or providing information associated with a media stream and/or media content and/or. For example, service representative device 460 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Service representative device 460 may communicate with user device 430 to enable a user to communicate with a service representative associated with a media stream, as described herein.

Network 470 includes one or more wired and/or wireless networks. For example, network 470 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
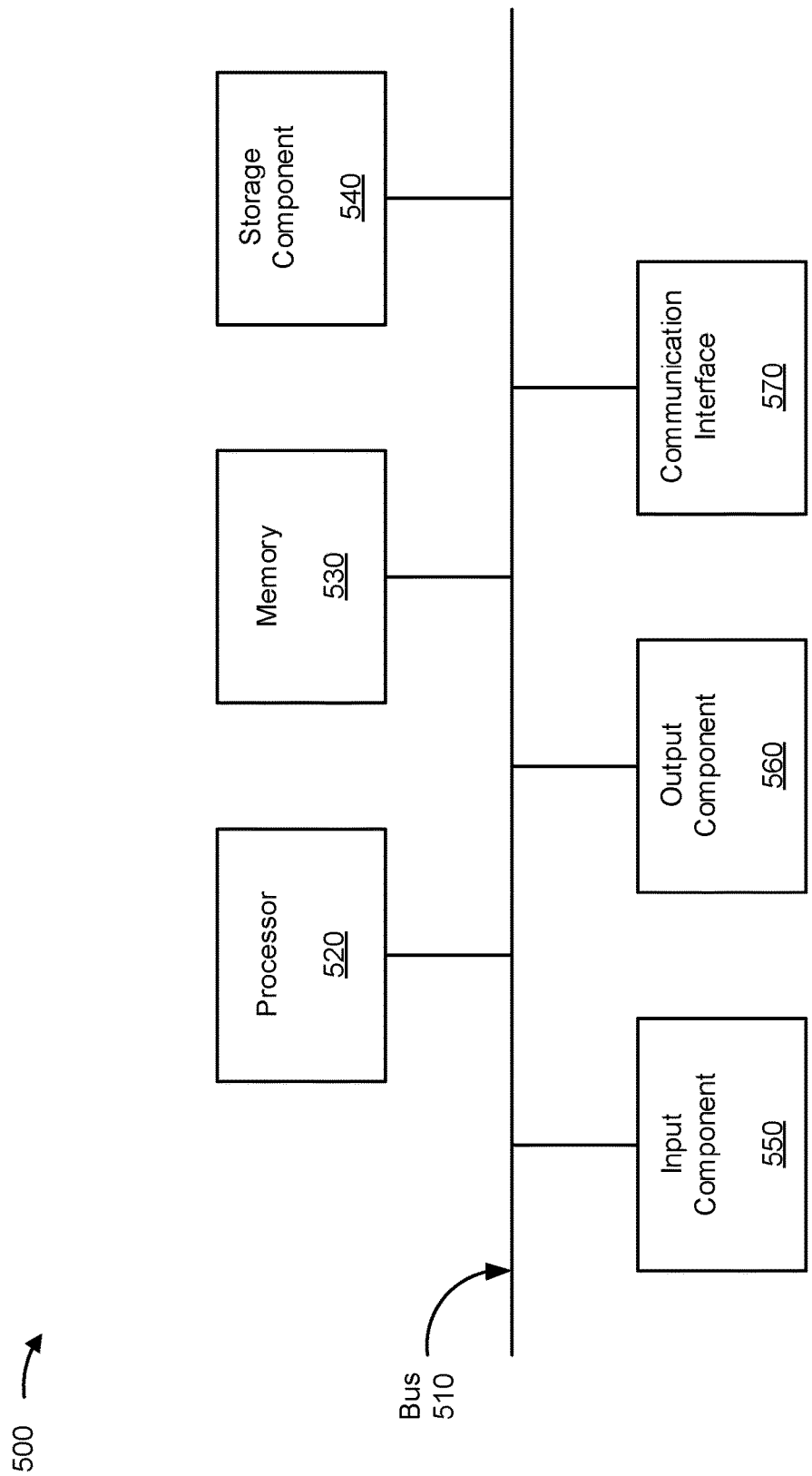
FIG. 5 is a diagram of example components of one or more devices of FIG. 4.

FIG. 5 is a diagram of example components of a device 500. Device 500 may correspond to media content platform 410, computing resource 415, cloud computing environment 420, user device 430, media platform 440, information platform 450, and/or service representative device 460. In some implementations, media content platform 410, computing resource 415, cloud computing environment 420, user device 430, media platform 440, information platform 450, and/or service representative device 460 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among components of device 500. Processor 520 is implemented in hardware, firmware, and/or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
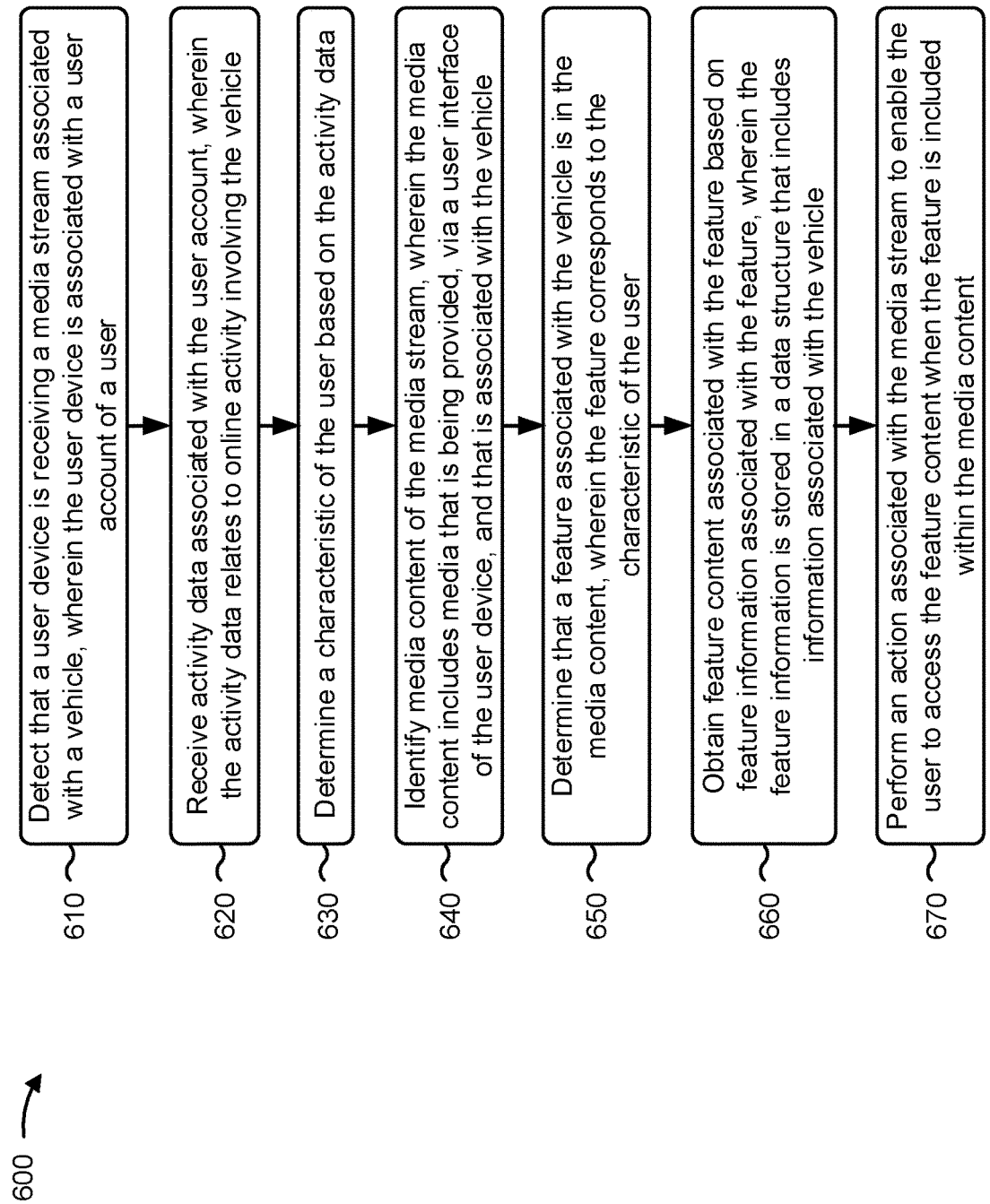
FIGS. 6-8 are flow charts of example processes for providing supplemental media content based on content of a media stream and a user accessing the media stream.

FIG. 6 is a flow chart of an example process 600 for providing supplemental media content based on content of a media stream and a user accessing the media stream. In some implementations, one or more process blocks of FIG. 6 may be performed by a media content platform (e.g., media content platform 410). In some implementations, one or more process blocks of FIG. 6 may be performed by another device or a group of devices separate from or including the media content platform, such as a computing resource (e.g., computing resource 415), a user device (e.g., user device 430), a media platform (e.g., media platform 440), an information platform (e.g., information platform 450), a service representative device (e.g., service representative device 460), and/or the like.

As shown in FIG. 6, process 600 may include detecting that a user device is receiving a media stream associated with a vehicle, wherein the user device is associated with a user account of a user (block 610). For example, media content platform (e.g., using computing resource 415, processor 520, memory 530, storage component 540, input component 550, communication interface 570, and/or the like) may detect that a user device is receiving a media stream associated with a vehicle, as described above. In some implementations, the user device is associated with a user account of a user.

As further shown in FIG. 6, process 600 may include receiving activity data associated with the user account, wherein the activity data relates to online activity involving the vehicle (block 620). For example, the media content platform (e.g., using computing resource 415, processor 520, memory 530, storage component 540, input component 550, communication interface 570, and/or the like) may receive activity data associated with the user account, as described above. In some implementations, the activity data relates to online activity involving the vehicle.

As further shown in FIG. 6, process 600 may include determining a characteristic of the user based on the activity data (block 630). For example, the media content platform (e.g., using computing resource 415, processor 520, memory 530, storage component 540, and/or the like) may determine a characteristic of the user based on the activity data, as described above.

As further shown in FIG. 6, process 600 may include identifying media content of the media stream, wherein the media content includes media that is being provided, via a user interface of the user device, and that is associated with the vehicle (block 640). For example, the media content platform (e.g., using computing resource 415, processor 520, memory 530, storage component 540, communication interface 570, and/or the like) may identify media content of the media stream, as described above. In some implementations, the media content includes media that is being provided, via a user interface of the user device, and that is associated with the vehicle.

As further shown in FIG. 6, process 600 may include determining that a feature associated with the vehicle is in the media content, wherein the feature corresponds to the characteristic of the user (block 650). For example, the media content platform (e.g., using computing resource 415, processor 520, memory 530, storage component 540, and/or the like) may determine that a feature associated with the vehicle is in the media content, as described above. In some implementations, the feature corresponds to the characteristic of the user.

As further shown in FIG. 6, process 600 may include obtaining feature content associated with the feature based on feature information associated with the feature, wherein the feature information is stored in a data structure that includes information associated with the vehicle (block 660). For example, the media content platform (e.g., using computing resource 415, processor 520, memory 530, storage component 540, communication interface 570, and/or the like) may obtain feature content associated with the feature based on feature information associated with the feature, as described above. In some implementations, the feature information is stored in a data structure that includes information associated with the vehicle.

As further shown in FIG. 6, process 600 may include performing an action associated with the media stream to enable the user to access the feature content when the feature is included within the media content (block 670). For example, the media content platform (e.g., using computing resource 415, processor 520, memory 530, storage component 540, input component 550, output component 560, communication interface 570, and/or the like) may perform an action associated with the media stream to enable the user to access the feature content when the feature is included within the media content, as described above.

Process 600 may include additional implementations, such as any single implementation or any combination of implementations described below and/or in connection with one or more other processes described elsewhere herein.

In some implementations, the media content platform may determine, based on the characteristic of the user and based on a machine learning model, that the user has a threshold level of interest in the feature of the vehicle, where the machine learning model has been trained based on historical data associated with past online activity of the user, and/or historical data associated with past online activity of one or more other users.

In some implementations, when determining that the feature is in the media content, the media content platform may perform an image processing technique of the media content using a feature recognition model, where the feature recognition model comprises a machine learning model that has been trained based on historical data associated with recognizing the feature in other media content that is associated with the vehicle, historical data associated with recognizing the feature in other media content that is associated with other vehicles, and/or historical data associated with recognizing, in other media content that is associated with other vehicles, other features that are related to the feature.

In some implementations, the media stream may include a multi-view image stream, and, when determining that the feature is in the media content, the media content platform may obtain, from the user device, a user input associated with displaying an image of the feature within the media content, where the user input indicates a view of the vehicle and the view is one of a plurality of views of the vehicle that are capable of being selected from the multi-view image stream, and may determine, from the information associated with the vehicle and the view of the vehicle, that the media content includes the image of the feature.

In some implementations, when obtaining the feature content, the media content platform may determine a type of the feature, and may generate the feature content based on the type of the feature, where the generated feature content is configured to be displayed within the media content in relation to the feature. In some implementations, the media content platform may request the user to authorize monitoring of the online activity, may receive a user input that authorizes the monitoring of the online activity, and may receive the activity data based on the user input.

In some implementations, when performing the action, the media content platform may embed the feature content into the media content, where the embedded feature content is configured to be displayed in relation to the feature when the user device displays, via the user interface, the feature within the media content.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
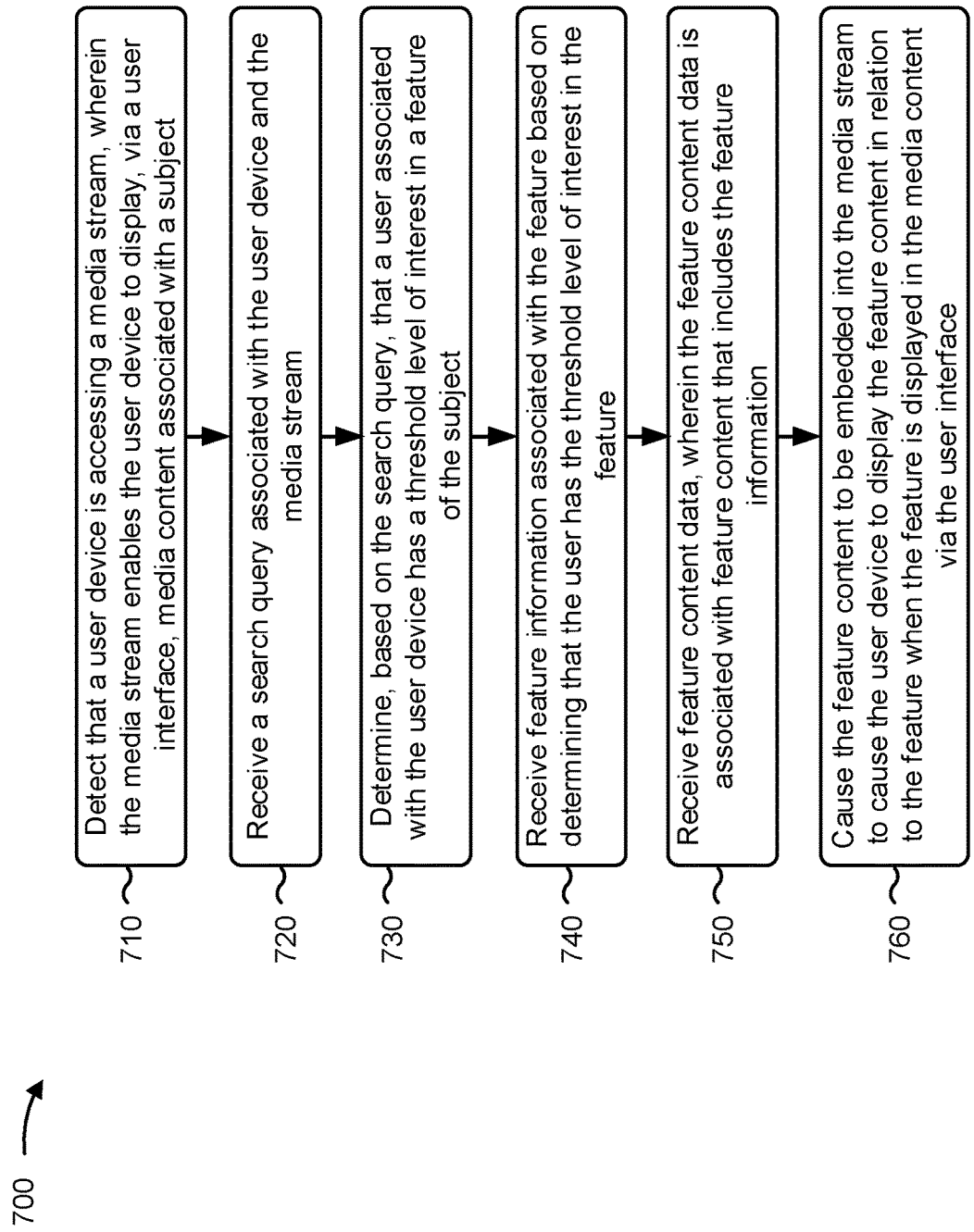

FIG. 7 is a flow chart of an example process 700 for providing supplemental media content based on content of a media stream and a user accessing the media stream. In some implementations, one or more process blocks of FIG. 7 may be performed by a media content platform (e.g., media content platform 410). In some implementations, one or more process blocks of FIG. 7 may be performed by another device or a group of devices separate from or including a media content platform (e.g., media content platform 410), such as a computing resource (e.g., computing resource 415), a user device (e.g., user device 430), a media platform (e.g., media platform 440), an information platform (e.g., information platform 450), and a service representative device (e.g., service representative device 460).

As shown in FIG. 7, process 700 may include detecting that a user device is accessing a media stream, wherein the media stream enables the user device to display, via a user interface, media content associated with a subject (block 710). For example, the media content platform (e.g., using computing resource 415, processor 520, memory 530, storage component 540, input component 550, communication interface 570, and/or the like) may detect that a user device is accessing a media stream, as described above. In some implementations, the media stream enables the user device to display, via a user interface, media content associated with a subject.

As further shown in FIG. 7, process 700 may include receiving a search query associated with the user device and the media stream (block 720). For example, the media content platform (e.g., using computing resource 415, processor 520, memory 530, storage component 540, input component 550, communication interface 570, and/or the like) may receive a search query associated with the user device and the media stream, as described above.

As further shown in FIG. 7, process 700 may include determining, based on the search query, that a user associated with the user device has a threshold level of interest in a feature of the subject (block 730). For example, the media content platform (e.g., using computing resource 415, processor 520, memory 530, storage component 540, and/or the like) may determine, based on the search query, that a user associated with the user device has a threshold level of interest in a feature of the subject, as described above.

As further shown in FIG. 7, process 700 may include receiving feature information associated with the feature based on determining that the user has the threshold level of interest in the feature (block 740). For example, the media content platform (e.g., using computing resource 415, processor 520, memory 530, storage component 540, communication interface 570, and/or the like) may receive feature information associated with the feature based on determining that the user has the threshold level of interest in the feature, as described above.

As further shown in FIG. 7, process 700 may include receiving feature content data, wherein the feature content data is associated with feature content that includes the feature information (block 750). For example, the media content platform (e.g., using computing resource 415, processor 520, memory 530, storage component 540, communication interface 570, and/or the like) may receive feature content data, as described above. In some implementations, the feature content data is associated with feature content that includes the feature information.

As further shown in FIG. 7, process 700 may include causing the feature content to be embedded into the media stream to cause the user device to display the feature content in relation to the feature when the feature is displayed in the media content via the user interface (block 760). For example, the media content platform (e.g., using computing resource 415, processor 520, memory 530, storage component 540, output component 560, communication interface 570, and/or the like) may cause the feature content to be embedded into the media stream to cause the user device to display the feature content in relation to the feature when the feature is displayed in the media content via the user interface, as described above.

Process 700 may include additional implementations, such as any single implementation or any combination of implementations described below and/or in connection with one or more other processes described elsewhere herein.

In some implementations, the media content platform may receive an authorization from the user, where the authorization authorizes monitoring of the user device for the search query, and may monitor the user device to detect the search query. In some implementations, the search query may have caused the user device to search for the subject and/or the feature of the subject.

In some implementations, when determining that the user is likely interested in the feature based on the search query, the media content platform may determine that the search query is one of a plurality of search queries that are associated with the feature and received within a threshold time period, and may determine that the plurality of search queries satisfies a threshold quantity, where the threshold quantity corresponds to an indication that the user is likely interested in the feature.

In some implementations, when receiving the feature information, the media content platform may identify the subject from the search query or the media stream, may identify a data structure associated with the subject, where the data structure is configured to store the feature information, and may obtain the feature information from the data structure.

In some implementations, when generating the feature content data, the media content platform may obtain an image or text associated with the feature, and may generate the feature content data to include data associated with the image or data associated with the text. Additionally, the media content platform may determine a location, within a structure of the media stream, for the feature content data, where the location corresponds to a location in the structure that includes media content that is associated with a view of the feature, and may insert, within the media stream, the feature content data at the location.

In some implementations, the media content platform may determine, in real-time, that the media content being displayed via the user interface includes an image of the feature, where the feature content data is embedded into the media stream, in real-time, based on determining that the media content being displayed via the user interface includes the image of the feature.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
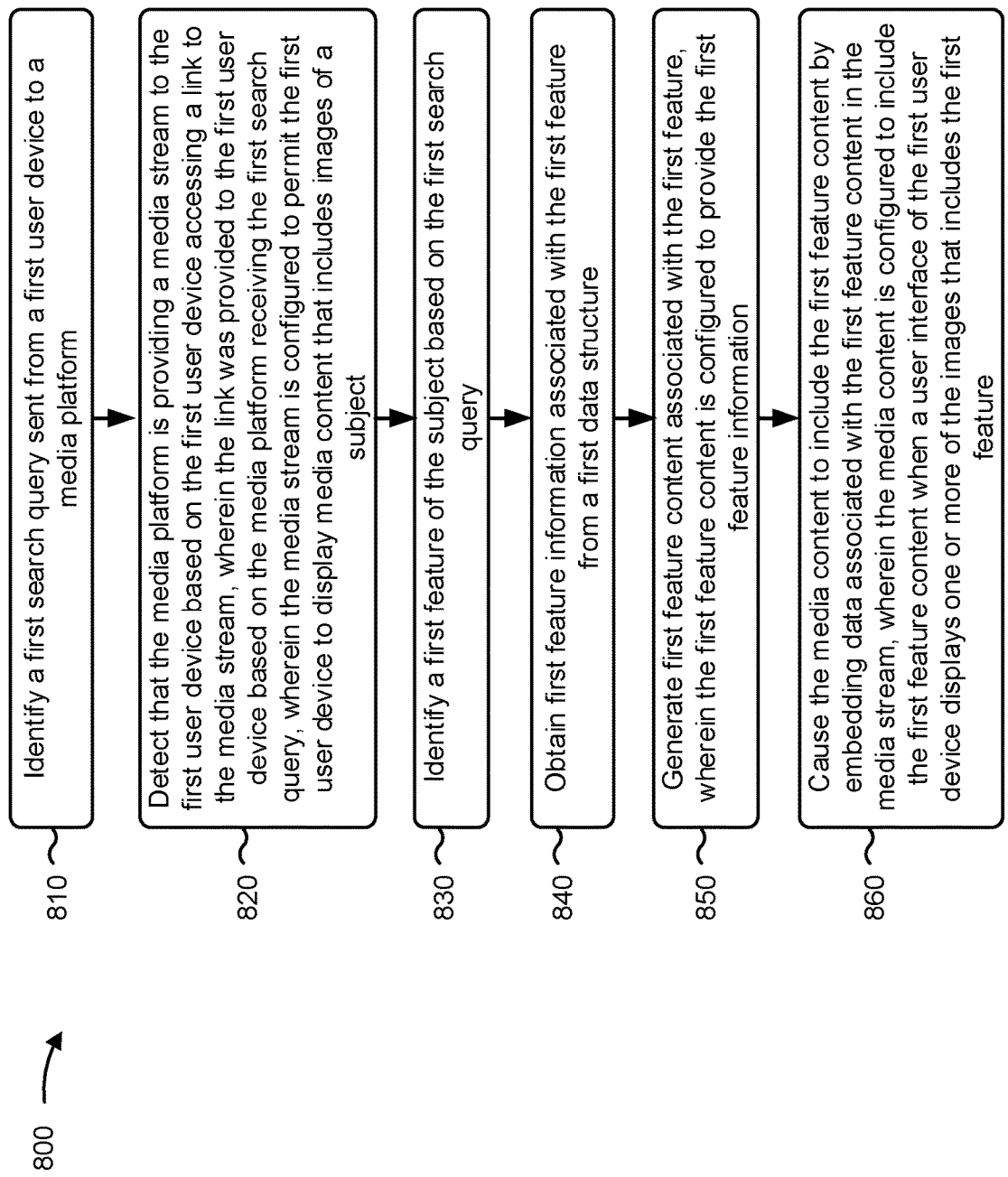

FIG. 8 is a flow chart of an example process 800 for providing supplemental media content based on content of a media stream and a user accessing the media stream. In some implementations, one or more process blocks of FIG. 8 may be performed by a media content platform (e.g., media content platform 410). In some implementations, one or more process blocks of FIG. 8 may be performed by another device or a group of devices separate from or including a media content platform (e.g., media content platform 410), such as a computing resource (e.g., computing resource 415), a user device (e.g., user device 430), a media platform (e.g., media platform 440), an information platform (e.g., information platform 450), and a service representative device (e.g., service representative device 460).

As shown in FIG. 8, process 800 may include identifying a first search query sent from a first user device to a media platform (block 810). For example, the media content platform (e.g., using computing resource 415, processor 520, memory 530, storage component 540, input component 550, communication interface 570, and/or the like) may identify a first search query sent from a first user device to a media platform, as described above.

As further shown in FIG. 8, process 800 may include detecting that the media platform is providing a media stream to the first user device based on the first user device accessing a link to the media stream, wherein the link was provided to the first user device based on the media platform receiving the first search query, and wherein the media stream is configured to permit the first user device to display media content that includes images of a subject (block 820). For example, the media content platform (e.g., using computing resource 415, processor 520, memory 530, storage component 540, input component 550, output component 560, communication interface 570, and/or the like) may detect that the media platform is providing a media stream to the first user device based on the first user device accessing a link to the media stream, as described above. In some implementations, the link is provided to the first user device based on the media platform receiving the first search query. In some implementations, the media stream is configured to permit the first user device to display media content that includes images of a subject.

As further shown in FIG. 8, process 800 may include identifying a first feature of the subject based on the first search query (block 830). For example, the media content platform (e.g., using computing resource 415, processor 520, memory 530, storage component 540, and/or the like) may identify a first feature of the subject based on the first search query, as described above.

As further shown in FIG. 8, process 800 may include obtaining first feature information associated with the first feature from a first data structure (block 840). For example, the media content platform (e.g., using computing resource 415, processor 520, memory 530, storage component 540, communication interface 570, and/or the like) may obtain first feature information associated with the first feature from a first data structure, as described above.

As further shown in FIG. 8, process 800 may include generating first feature content associated with the first feature, wherein the first feature content is configured to provide the first feature information (block 850). For example, the media content platform (e.g., using computing resource 415, processor 520, memory 530, storage component 540, and/or the like) may generate first feature content associated with the first feature, as described above. In some implementations the first feature content is configured to provide the first feature information.

As further shown in FIG. 8, process 800 may include causing the media content to include the first feature content by embedding data associated with the first feature content in the media stream, wherein the media content is configured to include the first feature content when a user interface of the first user device displays one or more of the images that include the first feature (block 860). For example, the media content platform (e.g., using computing resource 415, processor 520, memory 530, storage component 540, output component 560, communication interface 570, and/or the like) may cause the media content to include the first feature content by embedding data associated with the first feature content in the media stream, wherein the media content is configured to include the first feature content when a user interface of the first user device displays one or more of the images that include the first feature, as described above.

Process 800 may include additional implementations, such as any single implementation or any combination of implementations described below and/or in connection with one or more other processes described elsewhere herein.

In some implementations, the media content platform may identify a second search query sent from a second user device to the media platform, where the second user device is different from the first user device, and may detect that the media platform is providing the media stream to the second user device based on the second user device accessing the link to the media stream, where the link was provided to the second user device based on the media platform receiving the second search query, and where the media stream is configured to permit the second user device to display the media content that includes the images of the subject. Additionally, the media content platform may identify a second feature of the subject based on the second search query, may obtain second feature information associated with the second feature from a second data structure, and may generate second feature content associated with the second feature, where the second feature content is configured to provide the second feature information. Additionally, the media content platform may cause the media content to include the second feature content by embedding data associated with the second feature content in the media stream, where the media content is configured to include the second feature content when a user interface of the second user device presents one or more of the images that includes the second feature.

In some implementations, the first feature may be different from the second feature, and the media platform may provide the media stream to the first user device and the second user device substantially simultaneously. In some implementations, the media content platform may intercept the media stream before the media stream is received by the first user device, may embed the data associated with the first feature content in the media stream, and may provide the media stream to the first user device.

In some implementations, when generating the first feature content, the media content platform may determine a type of the first feature, and may generate the first feature content to include at least one of an image associated with the first feature or text associated with the first feature, based on the type of the first feature.

In some implementations, the media content platform may determine that the first feature is likely of interest to a user associated with the first user device based on the first search query having a threshold level of similarity to a plurality of other search queries associated with the first feature, where the first feature content is generated based on determining that the first feature is likely of interest to the user.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A non-transitory computer-readable medium storing a set of instructions, the set of instructions comprising:
one or more instructions that, when executed by one or more processors of a device, cause the device to:
detect that a media platform is providing a media stream to a first device based on the first device accessing a link to the media stream,
wherein the link was provided to the first device based on the media platform receiving a first search query, and
wherein the media stream is configured to permit the first device to display media content that includes images of a subject;
identify a first feature of the subject based on the first search query;
obtain first feature information associated with the first feature from a first data structure;
generate first feature content associated with the first feature,
wherein the first feature content is configured to provide the first feature information; and
cause the media content to include the first feature content by embedding data associated with the first feature content in the media stream,
wherein the media content is configured to include the first feature content when a user interface of the first device displays one or more of the images that include the first feature.

2. The non-transitory computer-readable medium of claim 1, wherein the one or more instructions, when executed by the one or more processors, further cause the one or more processors to:
intercept the media stream before the media stream is received by the first device;
embed the data associated with the first feature content in the media stream; and
provide the media stream to the first device.

3. The non-transitory computer-readable medium of claim 1, wherein the one or more instructions, that cause the one or more processors to generate the first feature content, cause the one or more processors to:
determine a type of the first feature; and
cause the first feature content to include at least one of an image associated with the first feature, or text associated with the first feature, based on the type of the first feature.

4. The non-transitory computer-readable medium of claim 1, wherein the first search query has a threshold level of similarity to a plurality of other search queries associated with the first feature, and
wherein the first feature content is generated based on determining that the first feature is likely of interest to the user.

5. The non-transitory computer-readable medium of claim 1, wherein the one or more instructions, when executed by the one or more processors, further cause the one or more processors to:
identify a second search query sent from a second device to the media platform, wherein the second device is different from the first device; and
detect that the media platform is providing the media stream to the second device based on the second device accessing the link to the media stream,
wherein the link was provided to the second device based on the media platform receiving the second search query.

6. The non-transitory computer-readable medium of claim 5, wherein the media content is configured to include a second feature content when a user interface of the second device presents one or more of the images that include the second feature.

7. The non-transitory computer-readable medium of claim 5, wherein the first feature is different from a second feature, and
wherein the media platform is providing the media stream to the first device and the second device substantially simultaneously.

8. A device, comprising:
one or more memories; and
one or more processors, coupled to the one or more memories, configured to:
identify a first search query sent from a first device to a platform;
detect that the platform is providing a stream to the first device based on the first device accessing a link to the stream, wherein the link was provided to the first device based on the platform receiving the first search query, and wherein the stream is configured to permit the first device to display content that includes images of a subject;

generate first feature content associated with a first feature associated with the subject, wherein the first feature content is configured to provide information associated with the first feature; and cause the content to include the first feature content by embedding data associated with the first feature content in the stream, wherein the content is configured to include the first feature content when a user interface of the first device displays one or more of the images that include the first feature.

9. The device of claim 8, wherein the one or more processors are further configured to:

intercept the stream before the stream is received by the first device;

embed the data associated with the first feature content in the stream; and provide the stream to the first device.

10. The device of claim 8, wherein the one or more processors are further configured to:

determine a type of the first feature; and cause the first feature content to include at least one of an image associated with the first feature, or text associated with the first feature, based on the type of the first feature.

11. The device of claim 8, wherein the first search query has a threshold level of similarity to a plurality of other search queries associated with the first feature, and wherein the first feature content is generated based on determining that the first feature is likely of interest to the user.

12. The device of claim 8, wherein the one or more processors are further configured to:

identify a second search query sent from a second device to the platform, wherein the second device is different from the first device; and detect that the platform is providing the stream to the second device based on the second device accessing the link to the stream, wherein the link was provided to the second device based on the platform receiving the second search query.

13. The device of claim 12, wherein the content is configured to include a second feature content when a user interface of the second device presents one or more of the images that include the second feature.

14. The device of claim 12, wherein the first feature is different from a second feature, and wherein the platform is providing the stream to the first device and the second device substantially simultaneously.

15. A method, comprising:

identifying, by a device, a first search query sent from a first device to a platform;

detecting, by the device, that the platform is providing a stream to the first device based on the first device accessing a link to the stream, wherein the link was provided to the first device based on the platform receiving the first search query, and wherein the stream is configured to permit the first device to display content that includes images of a subject;

identifying a first feature of the subject based on the first search query;

obtaining first feature information associated with the first feature from a first data structure;

generating first feature content associated with the first feature, wherein the first feature content is configured to provide the first feature information; and causing, by the device, the content to include the first feature content by embedding data associated with the first feature content in the stream, wherein the content is configured to include the first feature content when a user interface of the first device displays one or more of the images that include the first feature.

16. The method of claim 15, further comprising:

intercepting the stream before the stream is received by the first device;

embedding the data associated with the first feature content in the stream; and providing the stream to the first device.

17. The method of claim 15, further comprising:

determining a type of the first feature; and causing the first feature content to include at least one of an image associated with the first feature, or text associated with the first feature, based on the type of the first feature.

18. The method of claim 15, wherein the first search query has a threshold level of similarity to a plurality of other search queries associated with the first feature, and wherein the first feature content is generated based on determining that the first feature is likely of interest to the user.

19. The method of claim 15, further comprising:

identifying a second search query sent from a second device to the platform, wherein the second device is different from the first device; and detecting that the platform is providing the stream to the second device based on the second device accessing the link to the stream, wherein the link was provided to the second device based on the platform receiving the second search query.

20. The method of claim 19, wherein the content is configured to include a second feature content when a user interface of the second device presents one or more of the images that include the second feature.

* * * * *